US005808638A

United States Patent [19]

Miki et al.

[11] Patent Number: 5,808,638

[45] Date of Patent: Sep. 15, 1998

[54] IMAGE FORMING APPARATUS IN WHICH A POTENTIAL WELL IS FORMED IN AN ELECTRODE TO OBTAIN STABLE RECORDING

[75] Inventors: Takeo Miki, Tokyo; Masashi Hiroki, Yokohama; Mitsuaki Kohyama, Tokyo; Yuka Nakamura, Yokohama, all of Japan

[73] Assignee: Kabushiki Kaisha Toshiba, Kawasaki, Japan

[21] Appl. No.: 795,308

[22] Filed: Feb. 4, 1997

[30] Foreign Application Priority Data

Feb. 6, 1996 [JP] Japan .................................... 8-019740

[51] Int. Cl.[6] ...................................................... G01D 15/16

[52] U.S. Cl. ............................................................... 347/55

[58] Field of Search .................................. 349/55, 20, 12, 349/40, 43

[56] References Cited

U.S. PATENT DOCUMENTS

| | | | |
|---|---|---|---|
| 4,263,601 | 4/1981 | Nishimura et al. | 347/55 |
| 4,404,573 | 9/1983 | Kocot et al. | 347/55 |
| 5,235,354 | 8/1993 | Larson | 347/55 X |
| 5,523,777 | 6/1996 | Kitamura | 347/55 |

FOREIGN PATENT DOCUMENTS

| | | | |
|---|---|---|---|
| 54-97425 | 8/1979 | Japan | 347/55 |
| 57-38163 | 3/1982 | Japan | 347/55 |
| 58-5264 | 1/1983 | Japan | 347/55 |
| 60-210462 | 10/1985 | Japan | 347/55 |
| 62-5282 | 1/1987 | Japan . | |
| 1-71761 | 3/1989 | Japan | 347/55 |
| 2-212149 | 8/1990 | Japan | 347/55 |
| 93/11866 | 6/1993 | WIPO . | |

*Primary Examiner*—S. Lee

*Attorney, Agent, or Firm*—Foley & Lardner

[57] ABSTRACT

The recording head have a substrate and a plurality of ring-shaped recording electrodes juxtaposed on the substrate. A counter electrode is located above the recording electrodes and spaced apart therefrom by a predetermined distance. Each recording electrode consists of a ring and a lead. A pulse generator is connected by an IC (not shown) to the leads, for applying a drive voltage to each recording electrode. The drive voltage consists of a bias voltage and a recording voltage higher than the bias voltage. When a bias voltage, having the same polarity as a charged polarity of coloring particles dispersed in an insulating liquid, is applied to each recording electrode, potential wells are formed. The coloring particles in ink are thereby trapped in the ring of the electrodes. The coloring particles agglomerate in the apical part of the ink meniscus formed at the recording electrode. When the recording voltage, having the same polarity as a charged polarity of the coloring particles. is applied to any recording electrodes selected in accordance with an image signal, the agglomeration of coloring particles flies from the potential well toward the counter electrode, forming any dot on a recording medium interposed between the recording head and the counter electrode.

22 Claims, 13 Drawing Sheets

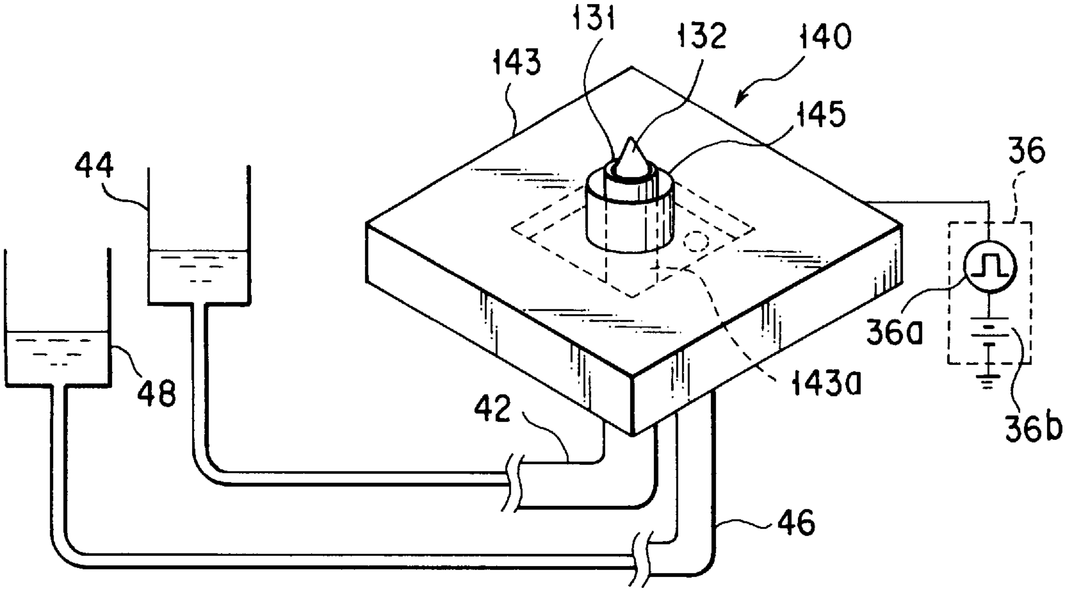
FIG. 26
FIG. 27A
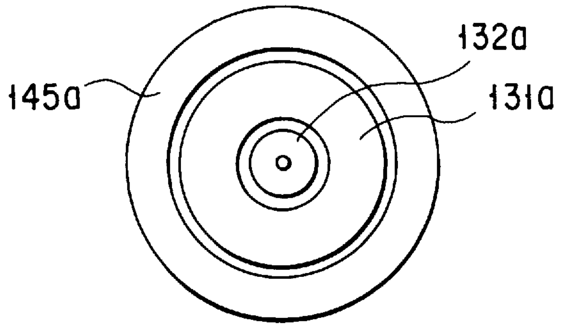
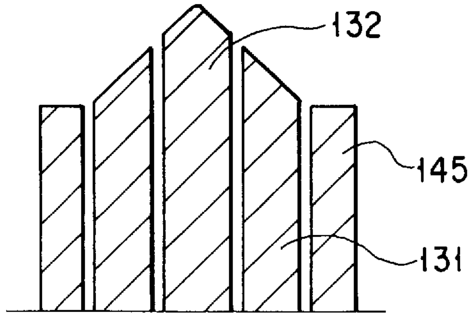
FIG. 27B

IMAGE FORMING APPARATUS IN WHICH A POTENTIAL WELL IS FORMED IN AN ELECTRODE TO OBTAIN STABLE RECORDING

BACKGROUND OF THE INVENTION

The present invention relates to an image forming apparatus which applies electrostatic force to ink composed of an electrically insulating liquid and coloring particles electrically charged and dispersed in the liquid, thereby to apply droplets of ink onto a recording medium and form an image thereon.

In recent years, ink-jet printing system has come into use in most personal printers. Images printed by conventional printers cannot long remain good in quality or have sufficient light fastness, because dye-type ink is used in the conventional ink-jet printers.

To form images which long remain good in quality and which have adequate light fastness, pigment particles may be used as coloring material in ink-jet printing. An ink-jet printer which can use pigment particles is disclosed in WO Publication 93/11866. This ink-jet printer comprises an electrically conductive ink-supplying tube for supplying electrically conductive ink and a counter electrode opposing the distal end of the ink-supplying tube and spaced therefrom by a predetermined distance. A recording medium is interposed between the distal end of the tube and the counter electrode so that an image may be formed on the recording medium.

The ink contains electrically charged pigment particles (hereinafter referred to as "toner"). To apply droplets of the ink onto the recording medium in order to form an image thereon, the ink is supplied through the tube, and a prescribed voltage is applied to the tube. A potential difference is thereby made between the counter electrode and the tube. The toner is electrically charged in the same polarity as the potential of the ink-supplying tube. Hence, the counter electrode applies electrostatic attraction to the toner at an ink-jetting point which is near the distal end of the ink-supplying tube. A hemispherical ink meniscus is thereby formed at the ink-jetting point. Due to the surface tension of the ink solvent, however, the toner cannot fly from the ink meniscus. Inevitably, the toner accumulates in the ink meniscus, forming a toner agglomeration.

When the potential difference between the ink-supplying tube and the counter electrode is increased, the electrostatic attraction the toner agglomeration receives become greater than the surface tension of the ink solvent. The toner agglomeration flies from the ink meniscus toward the counter electrode. It adheres to the recording medium, which is interposed between the ink-supplying tube and the counter electrode. An image is thereby formed on the recording medium.

Unlike the conventional ink-jet printer, the ink-jet printer described above has no nozzles which determine the size of ink droplets flying to the recording medium and can use toner-containing ink. The printer can therefore form images which can long remain good in quality and which have sufficient light fastness.

The ink-jet printer which uses toner-containing ink is disadvantageous in two respects. First, it takes a long time to accumulate toner in the ink meniscus, in an amount large enough to fly from the ink meniscus. Second, it is difficult to hold stably the toner agglomeration in the ink meniscus.

When the frequency of ejecting ink is enhanced, the toner agglomeration fails to grow as large as desired.

Consequently, the printer cannot form an image in a density as high as is desired. To form an image in a desired density, the frequency of ejecting ink may be reduced. The printer cannot form a high-quality image in this case, either, because it is difficult to hold stably the toner agglomeration in the ink meniscus.

BRIEF SUMMARY OF THE INVENTION

The present invention has been made in view of the foregoing. Its object is to provide an image forming apparatus which forms images in high resolution and high density at high speed, proving images of high quality.

To attain the object, an image forming apparatus according a first aspect of the the invention comprises: supplying means for supplying a recording liquid to a ejecting portion spaced apart from a recording medium by a predetermined distance, the recording liquid comprising an insulating liquid and charged coloring particles dispersed in the insulating liquid; agglomerating means for generating at the ejecting portion a ring-shaped potential well which has a higher potential at a circumference than at a center, thereby to trap and agglomerate the coloring particles in the potential well, which are contained in the recording liquid supplied by the supplying means to the ejecting portion; and recording means for generating an electric field near the ejecting portion in order to cause an agglomeration of coloring particles, formed by the agglomerating means, to fly to the recording medium, thereby to form an image on the recording medium.

An image forming apparatus according a second aspect of the invention comprises: a ring-shaped electrode provided in a plane substantially parallel to a recording medium and at a ejecting portion spaced apart from the recording medium by a predetermined distance; supplying means for supplying a recording liquid to the electrode, the recording liquid comprising an insulating liquid and charged coloring particles dispersed in the insulating liquid; agglomerating means for applying a bias voltage to the electrode to generate a first electric field extending from the electrode to the recording medium and a ring-shaped potential well generated right above said ring-shaped electrode and having a ring-shaped potential distribution, thereby to trap and agglomerate the coloring particles in the potential well, which are contained in the recording liquid supplied by the supplying means to the electrode; and recording means for applying a recording voltage higher than the bias voltage to the electrode and generate a second electric field which is more intense than the first electric field and which extends from the electrode to the recording medium, in order to cause an agglomeration of coloring particles, formed by the agglomerating means, to fly to the recording medium, thereby to form an image on the recording medium.

An image forming apparatus according a third aspect of the invention comprises: a plurality of ring-shaped electrodes arranged in a first substantially horizontal plane and below a recording medium positioned in a second substantially horizontal plane positioned at a predetermined distance from the first substantially horizontal plane; supplying means for applying a recording liquid over the first substantially horizontal plane, thereby to supply the recording liquid to the electrodes, the recording liquid comprising an insulating liquid and charged coloring particles dispersed in the insulating liquid; agglomerating means for applying a bias voltage to any electrode selected in accordance with an image signal, to generate a first electric field extending from the any electrode to the recording medium and generate a ring-shaped potential well generated right above said ring-shaped electrode and having a ring-shaped potential distribution, thereby to trap and agglomerate the coloring particles in the potential well, which are contained in the recording liquid supplied by the supplying means to the electrodes; and recording means for applying a recording voltage higher than the bias voltage to the any electrode and generate a second electric field which is more intense than the first electric field and which extends from the any electrode to the recording medium, in order to cause an agglomeration of coloring particles, formed by the agglomerating means, to fly to the recording medium, thereby to form an image on the recording medium in accordance with the image signal.

An image forming apparatus according a fourth aspect of this invention comprises: a liquid-supplying passage having a liquid-ejecting port at its distal end, which opposes a recording medium and which is spaced therefrom by a predetermined distance; supplying means for applying a recording liquid to the liquid-ejecting port through the liquid-supplying passage, the recording liquid comprising an insulating liquid and charged coloring particles dispersed in the insulating liquid; agglomerating means for generating a first electric field near the liquid-ejecting port, thereby to agglomerate the coloring particles in the recording liquid; recording means for generating a second electric field more intense than the first electric field in the vicinity of the liquid-ejecting port, thereby to cause an agglomeration of coloring particles, formed by the agglomerating means, to fly to the recording medium; and collecting means for collecting that part of the recording liquid which supplied to the liquid-ejecting port by the supplying means, which spills over the liquid-ejecting port and which flows along an outer surface of the liquid-supplying passage.

An image forming apparatus according to a fifth aspect of the present invention comprises: a tubular electrode located below a recording medium positioned in a substantially horizontal plane and extending in a substantially vertical direction, and having a liquid-ejecting port at its distal end, which opposes the recording medium and which is spaced therefrom by a predetermined distance; supplying means for applying a recording liquid to the liquid-ejecting port through the electrode thereby to form, at said liquid-ejecting port, an ink meniscus which bulges toward the recording medium, the recording liquid comprising an insulating liquid and charged coloring particles dispersed in the insulating liquid; agglomerating means for applying a bias voltage to the electrode to generate a first electric field extending from the electrode to the recording medium, thereby to agglomerate the coloring particles in an apical part of the meniscus formed by the supplying means; recording means for applying a recording voltage higher than the bias voltage to generate a second electric field more intense than the first electric field and extending from the electrode to the recording medium, thereby to cause an agglomeration of coloring particles, formed by the agglomerating means, to fly to the recording medium and thus form an image on the recording medium; and collecting means for collecting that part of the recording liquid which is supplied to the liquid-ejecting port by the supplying means, which spills over the liquid-ejecting port and which flows along an outer surface of the electrode.

A method of forming an image on a recording medium, according to a sixth aspect of the invention, comprises the steps of: supplying a recording liquid to a liquid-ejecting portion spaced apart from the recording medium by a predetermined distance, the recording liquid comprising an insulating liquid and charged coloring particles dispersed in the insulating liquid; generating at the liquid-ejecting portion a ring-shaped potential well which has a higher potential at a circumference than at a center, thereby to trap and agglomerate the coloring particles in the potential well, which are contained in the recording liquid supplied by the liquid-supplying means to the liquid-ejecting portion; and generating an electric field near the liquid-ejecting portion in order to cause an agglomerate of coloring particles, formed by the agglomerating means, to fly to the recording medium, thereby to form an image on the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 26 is a schematic perspective view of the main components of an image forming apparatus according to an eleventh embodiment of the present invention;

FIG. 27A is a plan view of recording electrode incorporated in an image forming apparatus shown in FIG. 26;

FIG. 27B is a sectional view of the electrode shown in FIG. 27A; and

DETAILED DESCRIPTION OF THE INVENTION

Embodiments of the present invention will be described, with reference to the accompanying drawing.

Figure 1A:
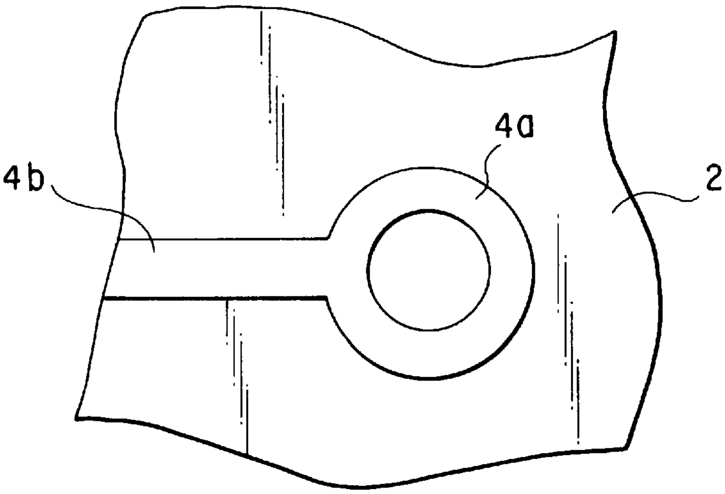
FIG. 1A is a plan view showing the major components of the recording head incorporated in an image forming apparatus according to a first embodiment of the invention.
Figure 1B:
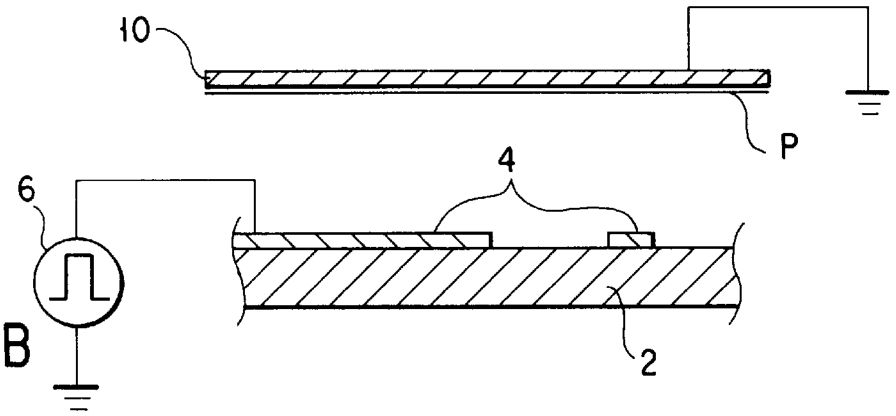
FIG. 1B is a sectional view of the components shown in FIG. 1A.
Figure 2A:
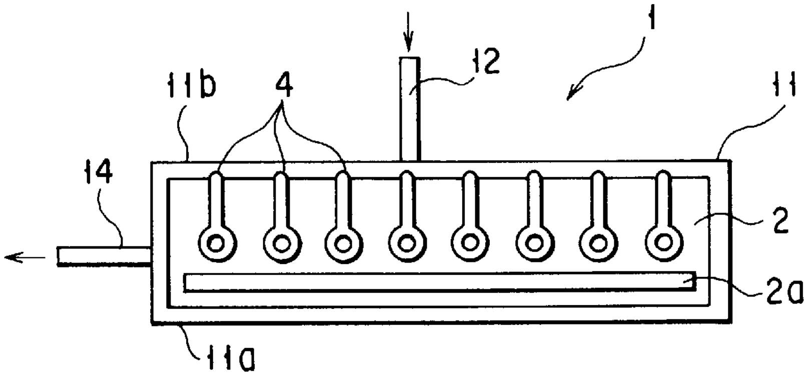
FIG. 2A is a plan view of the recording head incorporated in the image forming apparatus.
Figure 2B:
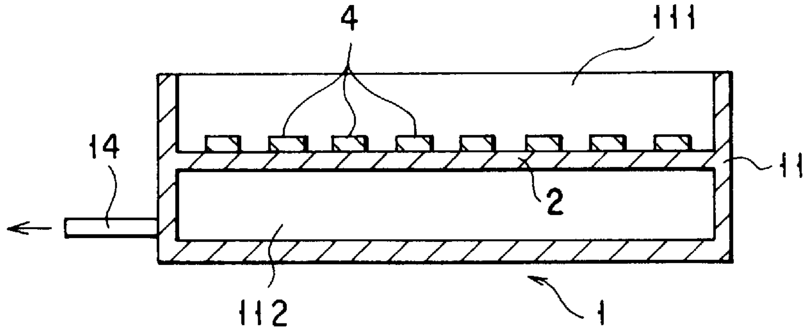
FIG. 2B is a sectional view of the recording head shown in FIG. 2A.

FIGS. 1A and 1B show the major components of a recording head incorporated in an ink-jet printer which is an image forming apparatus according to the first embodiment of the invention. FIGS. 2A and 2B illustrate the recording head 1.

As seen from FIG. 2B, the recording head 1 has a rectangular housing 11 which opens at the top, opposing a recording medium P. In the housing 11 an insulating rectangular substrate 2 is provided, spaced apart from the bottom of the housing 11 by a predetermined distance. The substrate 2 works as a partition dividing the interior of the housing 11 into two sections 111 and 112. These sections 111 and 112, which have substantially the same size, will be hereinafter referred to as "upper section" and "lower section," respectively.

A plurality of recording electrodes 4 are arranged on the upper surface of the substrate 2, which is exposed to the upper section 111 of the housing 11. The upper surface of the substrate 2 defines the ink-ejecting portion in the ink-jet printer. For the sake of simplicity, only eight recording electrodes 4 are illustrated in FIGS. 2A and 2B. The recording head 1 has far more recording electrodes 4.

As shown in FIG. 1A, each recording electrode 4 consists of a ring 4*a* and a lead 4*b* which are formed integral. The lead 4*b* extends straight from the ring 4*a*. As shown in FIG. 1B, the lead 4*b* is connected to a pulse generator 6 by an IC (not shown). The pulse generator 6 functions as ink-agglomerating means or recording means.

The ring 4*a* of the recording electrode 4 need not be circular as shown in FIG. 1A. It may be of any other shape. If not circular, it should be desirably regular polygonal. In the first embodiment, the ring 4*a* has an inner diameter of 200 μm, an outer diameter of 400 μm and a thickness of 35 μm, and the lead 4*b* has a thickness of 35 μm.

As seen from FIGS. 2A and 2B, the recording electrodes 4 are juxtaposed at regular intervals, such that the rings 4*a* arranged in a line extending in the lengthwise direction of the substrate 2 and the leads 4*b* extend to the back 11*b* of the housing 11. The substrate 2 has a ink-collecting slit 2*a*. The slit 2*a* extends straight in the lengthwise direction of the substrate 2, in front of the rings 4*a* of the recording electrodes 4. Due to the ink-collecting slit 2*a*, the upper section 111 and lower section 112 of the housing 11 communicate with each other.

Connected to the housing 11 are an ink-supplying tube 12 and an ink-collecting tube 14. More precisely, the tube 12 is connected to the back 11*b* of the housing 11 and communicates with the upper section 111 thereof. The tube 14 is connected to one side of the housing 11 and communicates with the lower section 112 thereof.

In operation, ink is supplied from an ink tank (not shown) to the recording head 1. It flows through the ink-supplying tube 12 into the upper section 111 thereof of the housing 11. In the upper section 111, the ink flows on the substrate 2, from the back 11*b* of the housing 11 to the ink-collecting slits 2*a*, first along the lead 4*b* of each recording electrode 4 and then along the ring 4*a* thereof. The ink flows down into the lower section 112 through the ink-collecting slit 2*a*. It is then discharged from the housing 11 through the ink-collecting tube 14. Outside the housing 11, the ink is supplied by a pump (not shown) back into the ink tank. The pressure of supplying the ink, the inner diameters of the tubes 12 and 14 and the width of the slit 2*a* have such values that the ink flowing on the substrate 2 always forms a layer having a prescribed thickness of, for example, 60 μm.

The ink flowing in the recording head 1 as described above is composed of carrier liquid and toner dispersed in the liquid. The carrier liquid is electrically insulating one such as petroleum solvent. The toner is made of coloring particles which are electrically charged. Each toner particle is formed of a binder particle, pigment, dispersant, antistatic agent and the like. The binder particle is made of, for example, resin or wax. The pigment, dispersant, antistatic agent and the like are either coated on the binder particle or contained in the binder particle. The toner particles dispersed in the carrier liquid are charged in the same polarity as the potential of the recording electrodes 4 or are to be charged so. In the first embodiment, the toner is positively charged beforehand.

As illustrated in FIG. 1B, the ink-jet printer has a counter electrode 10 located above and opposing the substrate 2 on which the recording electrodes 4 are provided. The counter electrode 10 is spaced part from the substrate 2 by a predetermined distance. To be more specific, the electrode 10 is located at a distance of about 1 mm from the recording electrodes 4. The electrode 10 is used to generate an electric field having a prescribed intensity, between itself and each of the recording electrodes 4. The counter electrode 10 extends substantially parallel to the substrate 2 and is connected to the ground.

The recording medium P is interposed between the recording head 1 and the counter electrode 10, so that an image may be formed on it. The medium P is fed along that lower surface of the counter electrode 10 which opposes the recording head 1. In other words, the medium P is moved across the recording electrodes 4 at a constant speed by a medium-feeding mechanism (not shown).

Figure 3:
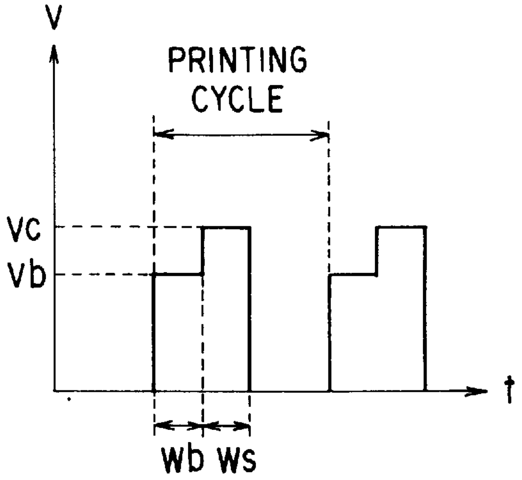
FIG. 3 is a graph representing the waveform of the drive voltage applied to any recording electrode selected of the head shown in FIG. 2A.

FIG. 3 represents the waveform of the drive voltage applied to any recording electrode 4 that is selected in accordance with an image signal. To cause the recording head 1 to form an image on the recording medium P, the ink is supplied into the head 1 as described above, the medium P is fed in the predetermined direction in the gap between the head 1 and the counter electrode 10, and the pulse generator 6 supplies a drive voltage (FIG. 3) via the IC (not shown) to the recording electrode 4 selected on the basis of the image signal.

As a result of this, an electric field is generated which has a prescribed intensity and which extends from the selected recording electrode 4 to the counter electrode 10. The electric field causes an ink droplet to fly from the recording electrode 4 toward the counter electrode 10. The ink droplet is applied onto the recording medium P, which is interposed between the recording electrodes 4 and the counter electrode 10. Thus, an image is formed on the medium P in accordance with the image signal.

As can be understood from FIG. 3, the drive voltage consists of two components, i.e., a bias voltage Vb and a recording voltage Vc. The bias voltage Vb which agglomerate the toner at the recording electrode 4 selected in accordance with the image signal. The recording voltage Vc is higher than the bias voltage Vb and causes an ink droplet containing the toner agglomeration to fly onto the recording medium P.

The potential of each recording electrode 4 remain at 0 V while no drive voltage is applied to the electrode 4. When an image signal is supplied to the IC (not shown), a bias voltage Vb having a pulse width Wb is first applied to the selected recording electrode 4 and a recording voltage Vc having a pulse width Wc is then applied to the recording electrode 4. The drive voltage is drive decreased to 0 V within one recording cycle.

In the first embodiment, the bias voltage Vb is 1.0 kV and has a pulse width Wb of 30 $\mu$sec, whereas the recording voltage Vc is 1.2 kV and has a pulse width Wc of 30 $\mu$sec.

How the ink behaves when a bias voltage (FIG. 3) is applied to an recording electrode 4 selected on the basis of an image signal will be described, with reference to FIGS. 4A to 4C.

Figure 4A:
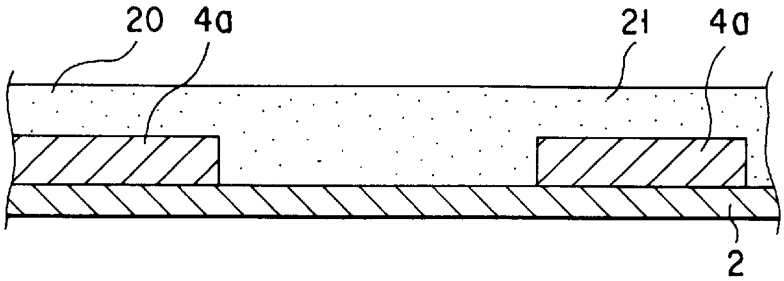
FIGS. 4A, 4B and 4C are diagrams for explaining how ink behaves when the drive voltage is applied to any recording electrode selected.

While no drive voltage is applied to the electrode 4 to form an image (or while a voltage of 0 V is applied to the electrode 4) as shown in FIG. 4A, no electric field exists between the recording electrode 4 and the counter electrode 10. No electrostatic force therefore acts on the toner 21 in the ink 20. The ink 20 flowing over the substrate 2 forms a layer uniform in thickness. In the ink layer, the toner 21 is dispersed uniformly.

Figure 4B:
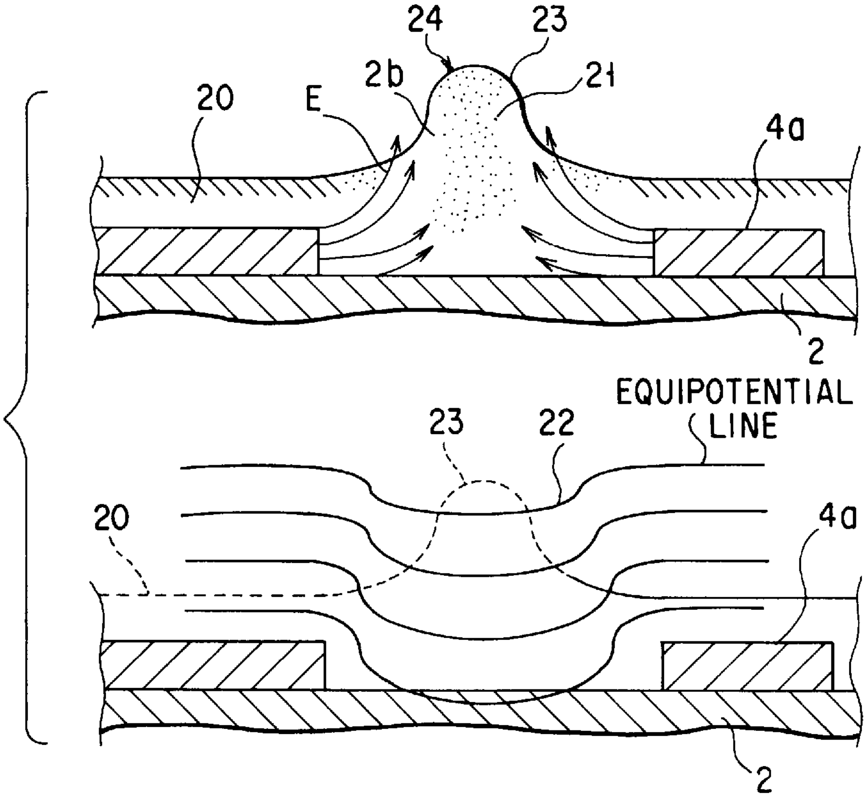
Figure 4C:
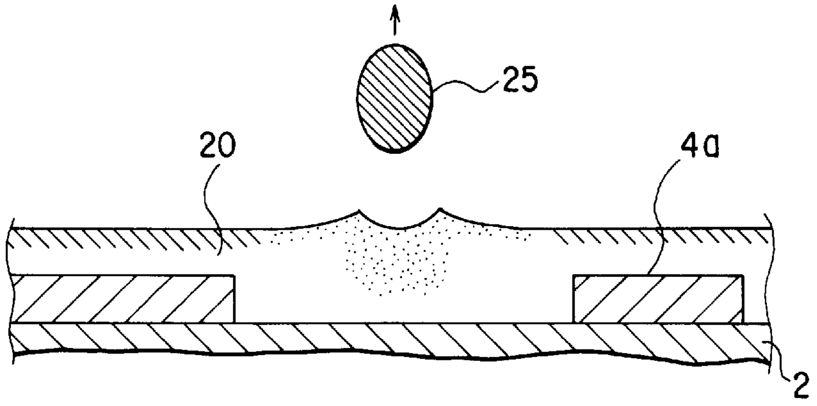

When a bias voltage Vb is applied to the electrode 4 in accordance with the image signal as illustrated in FIG. 4B, there is generated an electric field E between the recording electrode 4 and the counter electrode 10. Further, a potential well 22 is generated near the ring 4*a* of the recording electrode 4. The potential well 22 is the region which gas a potential lower than the surrounding regions. In the present invention, a region at a relatively high potential is formed above the ring 4*a* of the electrode 4, and a potential well at a relatively low potential is formed inside the ring 4*a*.

More precisely, as the bias voltage Vb is applied to the electrode 4, a leakage field E develops in the ring 4*a*, extending toward the center of the ring 4*a* as indicated by arrows E in FIG. 4B. The leakage field E extends along the inner periphery of the ring 4*a*. The leakage field E causes the toner 21 to migrate in the ring 4*a* to the center thereof. The toner 21 reaches the center of the ring 4*a* and trapped in the potential well 22. Hence, the toner particles agglomerate in the potential well 22.

As the toner particles agglomerate at the center of the ring 4*a*, the electrostatic force acting on the toner particles (i.e., electrically charged particles) toward the counter electrode 10 increases, pulling the toner particles toward the counter electrode 10. An ink meniscus 23 is thereby formed which bulges toward the electrode 10, with its apex located at the center of the ring 4*a*.

The electrostatic force acting on the toner 21 is not so large as to overcome the surface tension of the ink meniscus 23. The toner particles agglomerating at the center of the ring 4*a* are therefore trapped in the apical part of the ink meniscus 23. An ink droplet containing the toner agglomeration 24 does not fly from the ink meniscus 23 toward the counter electrode 10.

When a recording voltage Vc higher than the bias voltage Vb is applied to the recording electrode 4, the electrostatic force acting on that part of the ink meniscus 23 which contains the toner agglomeration 24 increases over the surface tension of the ink 20. As a result, an ink droplet 25 containing the agglomeration 24 flies from the ink meniscus 23 toward the counter electrode 10.

In this case, the electrostatic force for causing an ink droplet to fly acts mainly on the toner 21. It follows that most part of the ink droplet 25 is the toner agglomeration 24. In other words, the carrier liquid 26, the other part of the droplet 25, exists in a small amount just enough to wet the toner 21. The ink droplet 25 on the recording medium P is scarcely flowable, forming on the medium P a dot not bleeding or flowing at all.

After a dot has been thus formed on the recording medium P, the apply of the drive voltage from the pulse generator 6 to the recording electrode 4 is terminated. That is, the drive voltage applied on the electrode 4 falls to 0 V within the recording cycle. The ink 20 on the electrode 4 resumes the initial condition shown in FIG. 4A. The moment the potential of the electrode 4 is decreased to 0 V, the potential well 22 ceases to exist at the center of the ring 4*a*. The electric field E no longer exists in the ink 20 flowing over the substrate 2. The toner 21 in the ink 20 does not receives an electrostatic force any more. The toner 21 can therefore move into the opening of the ring 4*a*.

The first embodiment described above is characterized in that a prescribed voltage is applied on the recording electrode 4 having a ring 4*a*, forming a potential well 22 near the ring 4*a*. In the potential well 22 the toner particles are trapped, thus forming a toner agglomeration in the apical part of the ink meniscus. The toner agglomeration is made to fly onto the recording medium P.

Ink droplets can therefore fly, although the ink-jet printer does not use slits or a nozzles as the conventional ink-jet printer. Having neither slits nor nozzles which may be clogged with ink, the ink-jet printer according to the first embodiment of the invention can use various types of ink. The printer can make a toner agglomeration (i.e., a group of pigment particles) fly from any selected recording electrode toward the counter electrode. The printer can therefore form images which long remain good in quality and which have sufficient light fastness.

Since no ink clogging occurs in the first embodiment, the recording electrodes can be narrower than in the conventional ink-jet printer. The recording head can therefore have more recording electrodes arranged in higher density and have a greater recording width than the conventional ink-jet printer. The recording head can apply more ink droplets onto a recording medium within a unit time, forming an image at higher speed than is possible with the conventional ink-jet printer.

An ink-jet printer according to the second embodiment of the invention will be described, with reference to FIGS. 5 to 8 and FIGS. 9A to 9C.

Figure 5:
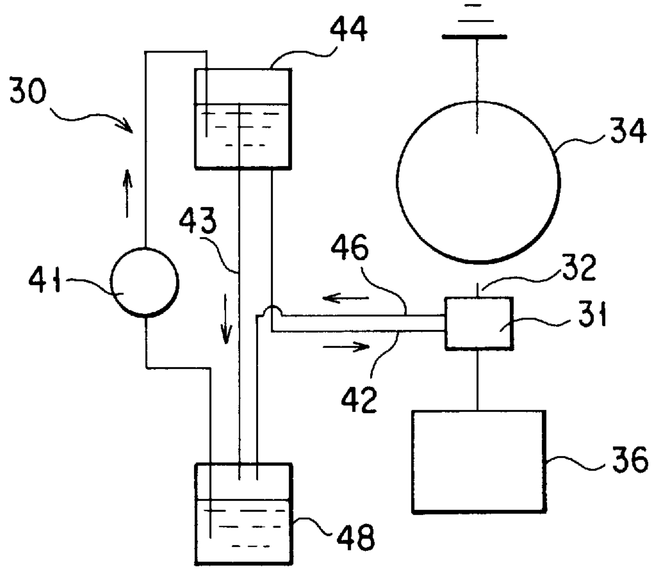
FIG. 5 is a schematic diagram illustrating an image forming apparatus according to a second embodiment of the present invention.
Figure 6:
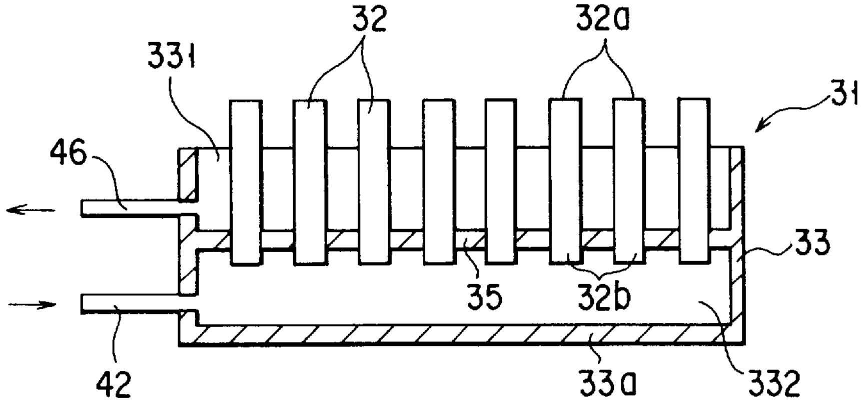
FIG. 6 is a sectional view of the recording head incorporated in the apparatus illustrated in FIG. 5.

FIG. 5 is a schematic diagram illustrating the ink-jet printer 30. As FIG. 6 shows, the ink-jet printer 30 has a recording head 31. As shown in detail in FIG. 6, the head 31 has a plurality of pipe-shaped recording electrodes 32. The recording electrodes 32 are arranged in a row, each extending substantially in vertical direction. Although only eight electrodes 32 are shown in FIG. 6 for the sake of simplicity, the recording head 31 has far more recording electrodes.

As shown in FIG. 5, a drum 34, or a counter electrode, is located above the recording head 31, opposing the distal ends of the recording electrodes 32. The drum 34 is connected to the ground, provided for generating an electric field between itself and each recording electrode 32. In the second embodiment, the drum 34 is spaced apart from the distal ends 32*a* by a distance of 1 mm. A recording medium (not shown) is interposed between the recording head 31 and the drum 34 so that an image may be formed on the medium. The recording medium is fed along the circumferential surface of the drum 34 by means of a medium-feeding mechanism (not shown).

A pulse generator 36 is connected to the recording head 31 by an IC (not shown) to apply a drive voltage of a predetermined value to any recording electrode 32 selected. The pulse generator 36 functions as ink-agglomerating means or recording means. An ink-supplying tube 42 connects an ink-supplying tank 44 to the recording head 31. An ink-collecting tube 46 connects the recording head 31 to an ink-collecting tank 48. The ink-supplying tank 44 and the ink-supplying tube 42 work as ink-supplying means.

The ink-supplying tank 44 is located right above the ink-supplying tank 44. The tanks 44 and 48 are connected to each other by a pipe which has a pump 41, for drawing the ink upwards from the ink-collecting tank 48 into the ink-supplying tank 44.

The tanks 44 and 48 are connected by an ink-draining pipe 43. The ink-draining pipe 43 has its upper end positioned at the same level as the surface of the ink in the ink-supplying tank 44. Hence, the position of the upper end of the pipe 43 may be changed to set the ink surface in the tank 44 at a desired level. The pressure at which the ink is supplied to the recording head 31 can therefore be adjusted to a desired value.

As shown in FIG. 6, the recording head 31 has a rectangular housing 33 which opens at the top, opposing the drum 34. In the housing 33, a partition 35 is provided. The partition 35 is spaced apart from the bottom of the housing 33 by a predetermined distance. The partition 33 divides the interior of the housing 33 two sections 331 and 332. These sections 331 and 332, which have substantially the same size, will be hereinafter referred to as “upper section” and “lower section,” respectively. The recording electrodes 32 have their lower end portions held in the holes made in the partitions 35.

Each recording electrode 32 is a hollow circular cylinder made of metal such as stainless (SUS) or resin such as nylon. The electrode 32 is electroless-plated with a metal layer, on its inner and outer circumferential surfaces. Each electrode 32 has its upper end portion 32*a* protruding upwards from the top of the housing 33 and its lower end portion 32*b* communicating with the lower section 332.

The recording electrodes 32 may be hollow polygonal cylinders, not hollow circular cylinders. If not circular cylinders, they should be desirably regular polygonal ones. In the second embodiment, the electrode 32 have an inner diameter of 500 $\mu$m, an outer diameter of 1 mm and a length of 10 mm.

The ink-supplying tube 42 and the ink-collecting tube 46 are connected to one side of the housing 33, communicating with the lower section 332 and the upper section 331, respectively. The ink is supplied from the ink-supplying tank 44 through the ink-supplying tube 42 at a prescribed pressure flows into the lower section 332 of the housing 33, filling the lower section 332. The ink then flows upwards through the hollow cylindrical recording electrodes 32 and spills over the distal end 32*a* of the electrodes 32. It further flows downwards along the outer circumferential surface of each electrode 32, gradually filling the upper section 331 of the housing 33. It is discharged from the upper section 331 through the ink-collecting tube 46 and collected in the ink-collecting tank 48. The ink thus collected is drawn up by the pump 41 into the ink-supplying tank 44. Thus, the ink circuits in the circuit comprises of the tank 44, the tube 42, the housing 33, the tube 46, the tank 48 and the pump 41.

The pressure of supplying the ink, the inner diameters of the tubes 42 and 46 and the inner diameter of each recording electrode 32 have such values that a stable ink meniscus is formed at the distal end 32*a* of the recording electrode 32 as will be explained later. The upper section 331, the ink-collecting tube 46 and the ink-collecting tank 48 constitute an ink-collecting means.

How the ink-jet printer according to the second embodiment operates will be explained, with reference to the recording head 51 shown in FIG. 7 which has one recording electrode 32, for simplicity of explanation. The head 51 is essentially the same as the recording head 31. The components of the head 51, which are similar or identical to those of the head 31, are denoted as the same reference numerals in FIG. 7 and will not be described in detail in the following description.

Figure 7:
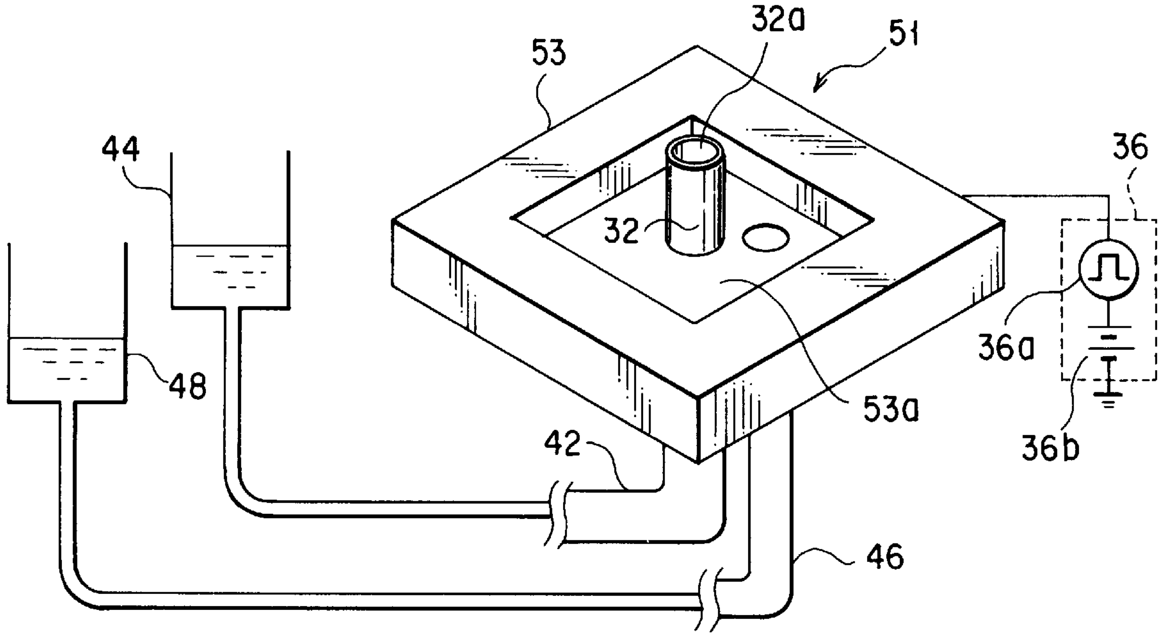
FIG. 7 is a schematic perspective view showing the main components of the image forming apparatus illustrated in FIG. 5.

As seen from FIG. 7, the recording head 51 has a substrate 53 which is substantially rectangular. The substrate 53 has a rectangular recess 53*a* in its upper surface. The recording electrode 32, which is a hollow cylinder, passes through the substrate 53 and protrudes upwards from the substantially central part of the recess 53*a*. The substrate 53 has a through hole open at the recess 53*a*, located near the recording electrode 32 and communicating with an ink-collecting tube 46. The electrode 32 is connected at its proximal end 32*b* to an ink-supplying tube 42.

The ink supplied from an ink-supplying tank 44 through the ink-supplying tube 42 flows upwards through the recording electrode 32 and spills from the distal end 32*a* of the electrodes 32. The ink flows down along the outer circumferential surface of the electrode 32 into the recess 53*a*. It is then collected through an ink-collecting tube 46 into an ink-collecting tank 48.

A pulse generator 36 is connected to the recording head 51 to apply a drive voltage of a predetermined value to the recording electrode 32. The pulse generator 36 comprises a pulse voltage generating section 36*a* and a DC voltage generating section 36*b*. The section 36*a* generates a recording voltage Vc which is to be applied to the recording electrode 32. The section 36*b* generates a bias voltage Vb to be applied to the recording electrode 32.

Figure 8:
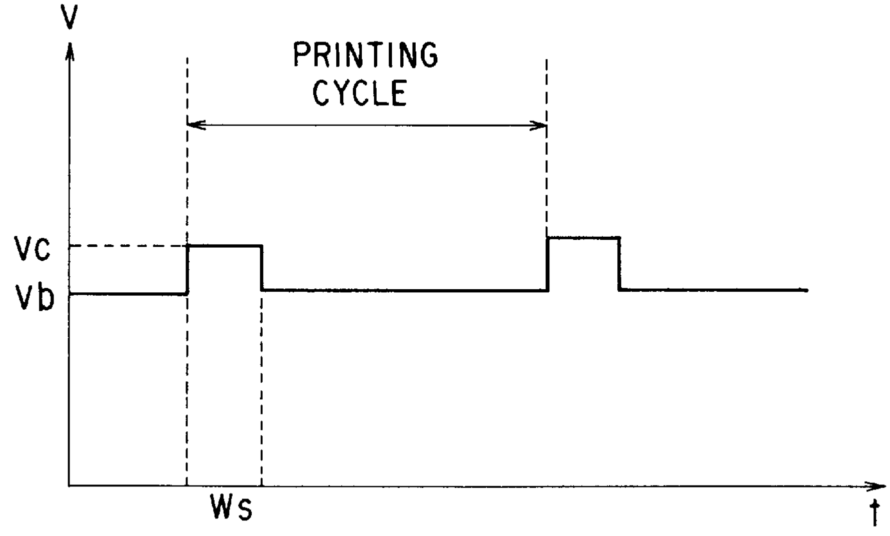
FIG. 8 is a graph representing the waveform of the drive voltage applied to a recording electrode of the head shown in FIG. 7.

FIG. 8 illustrates the waveform of the drive voltage applied to the recording electrode 32 in accordance with an image signal. As seen from FIG. 8, the drive voltage consists of two components, i.e., a bias voltage Vb and a recording voltage Vc higher than the bias voltage Vb. The bias voltage Vb is to be applied to the recording electrode 32 while the electrode 32 remains not selected. The recording voltage Vc is applied to the electrode 32 in accordance with the image signal. The recording electrode 32 is set at the bias voltage Vb within one recording cycle after it has been set at the recording voltage Vc in accordance with the image signal. In the second embodiment, the bias voltage Vb is 1.0 kV, the recording voltage Vc is 1.2 kV, and the time Ws during which the voltage Vc is applied to the electrode 32 is 30 $\mu$sec.

How the ink behaves when the drive voltage (FIG. 8) is applied to the recording electrode 32 will be described, with reference to FIGS. 9A to 9C.

Figure 9A:
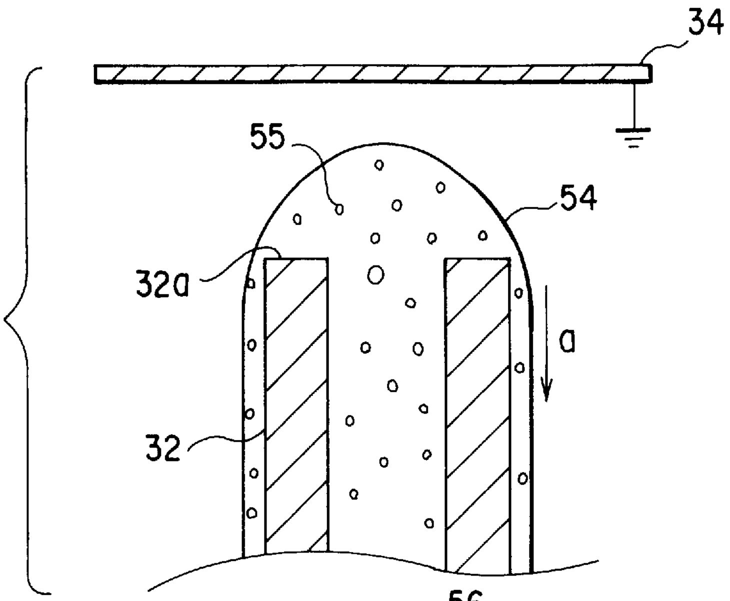
FIGS. 9A, 9B and 9C are diagrams for explaining how ink behaves when the drive voltage is applied to the recording electrode of the recording head shown in FIG. 7.

While no drive voltage is applied to the electrode 32 as shown in FIG. 9A, the ink supplied from the ink-supplying tank 44 rises in the recording electrode 32. It spills over the distal end 32*a* of the electrode 32 at a constant rate, flowing down in the direction of arrow a, along the outer circumferential surface of the electrode 32. The ink forms a meniscus 54 at the distal end 32*a*. The ink meniscus 54 has a shape and size which are determined by the pressure at which the ink is supplied, the shape the distal end 32*a* of the electrode 32 has, the surface tension the ink has, and the like. In the present embodiment, the meniscus 54 is hemispherical, having a radius of 200 $\mu$m measured from the center of the distal end 32*a* of the electrode 32. The ink-supplying pressure is adjusted such that the meniscus 54 has an apex on the axis of the recording electrode 32. Toner 55 is uniformly dispersed in the ink as long as the electrode 32 is applied with no drive voltage, and no electrostatic force therefore acts on the toner 55.

Figure 9B:
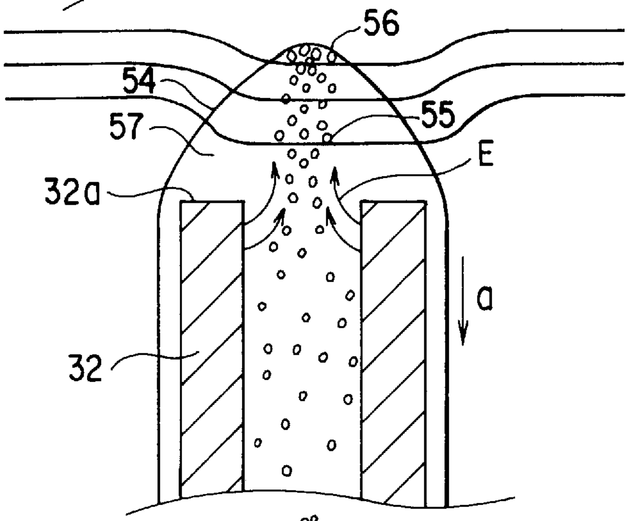
Figure 9C:
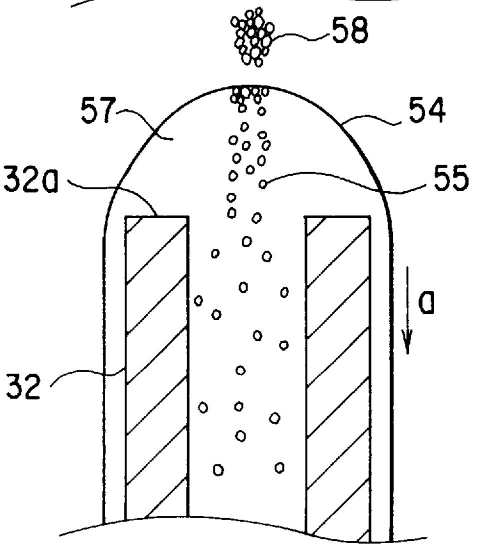

When the bias voltage Vb is applied to the recording electrode 32, a first electric field E is generated near the distal end 32*a* of the electrode 32 as is shown in FIG. 9B. That is, a potential well of the above-mentioned type is formed and an electric field leaks E from inside the recording electrode 32, forming an electric field which extends toward the axis of the recording electrode 32, around the inner circumferential surface thereof. The electric field E causes the toner 55 to migrate in the ink meniscus 54 toward the axis of the recording electrode 32.

The toner particles 55 migrating to the axis of the electrode 32 move to the apex of the hemispherical ink meniscus 54, forced by the electric field which extends toward a counter electrode 34 and by the ink flowing toward the electrode 34. The toner particles 55 therefore agglomerate in the apical part of the ink meniscus 54, forming a toner agglomeration 56. The toner agglomeration 56 thus formed is stably held in the apical part of the ink meniscus 54, thanks to the electric field E and the flow of the ink.

As the toner particles 55 gradually agglomerate, the electrostatic force attracting the particles 55 toward the counter electrode 34 increases, forcing the toner agglomeration 56 toward the electrode 34. As a result, the apical part of the meniscus 54 swells toward the counter electrode 34. The electrostatic force exerted on the toner 55 is not strong enough to overcome the surface tension of the ink. Hence, an ink droplet containing the toner agglomeration 56 does not fly from the ink meniscus 54 to the recording electrode 32.

The carrier liquid 57 which constitutes the ink, together with the toner 55, is not electrically charged. Therefore, the carrier liquid 57 is not influenced by the electric field E at all. The liquid 57 spills over the distal end 32*a* of the recording electrode 32. It then flows down in the direction of arrow a, along the outer circumferential surface of the electrode 32.

Thus, while the bias voltage Vb is applied to the electrode 32 as shown in FIG. 9B, the toner particles 55 are isolated from the carrier liquid 57 as soon as they agglomerate, forming the toner agglomeration 56. At the same time, the carrier liquid 57 not helping the toner particles 55 to agglomerate or the ink droplet to fly is drained from the distal end 32*a* of the recording electrode 32.

Then, the recording voltage Vc is applied to the recording electrode 32, generating a second electric field near the distal end 32*a* of the electrode 32. The second electric field is more intense than the first electric field. Then, the electrostatic force on the toner agglomeration 56 in the apical part of the ink meniscus 54 increases, overcoming the surface tension of the ink. This force separate an ink droplet 58 containing the toner agglomeration 56, from the ink meniscus 54. The ink droplet 58 flies from the distal end 32*a* of the recording electrode 32 to the counter electrode 34.

In this case, the electrostatic force which causes an ink droplet to fly toward the counter electrode 34 acts on the toner agglomeration 56. Most part of the ink droplet 58 is therefore the toner agglomeration 56. In other words, the carrier liquid 57, the other part of the droplet 58, exists in a small amount just enough to wet the toner 55. The ink droplet 58 on the recording medium P is scarcely flowable, forming on a recording medium (not shown) a dot which neither bleeds nor flows.

After a dot has been thus formed on the recording medium, the voltage applied on the recording electrode 32 is reduced to the bias voltage Vb. The ink meniscus 54 is thereby quickly brought back to the state shown in FIG. 9B. The toner 55 is fast replenished in the apical part of the ink meniscus 54 due to the flow of the ink and the electric field E, making up for the toner agglomeration 56 contained in the ink droplet which has just flown onto the recording medium.

The second embodiment described above is characterized in two respects. First, the toner particles 55 agglomerate in the apical part of the ink meniscus 54 formed at the distal end 32*a* of the recording electrode 32, because of the ink flowing toward the counter electrode 34 and the electric field E extending toward the counter electrode 34. Second, the toner particles 55 are isolated from the carrier liquid 57, whereby the resultant toner agglomeration can efficiently fly toward the counter electrode 34.

Therefore, it is possible with the second embodiment to make the toner fly with high efficiency without supplying a large amount of ink. In addition, the toner 55 hardly sticks to the inner surface of the electrode 32 since the electric field E which extends from the distal end 32*a* of the electrode 32 toward the counter electrode 34, making the toner particles concentrate on the axis of the electrode 32. This renders it least possible that the recording electrode 32 is clogged with the toner.

Thus, like the first embodiment, the second embodiment is advantageous in some respects. First, it can use various types of ink. Second, it can make a toner agglomeration (i.e., a group of pigment particles) fly from any selected recording electrode toward the counter electrode and can therefore form images which long remain good in quality and which have sufficient light fastness. Third, since no ink clogging occurs, the recording electrodes can be more slender than in the conventional ink-jet printer. Fourth, the recording head can therefore have more recording electrodes arranged in higher density and have a greater recording width than the conventional ink-jet printer. Further, the recording head can apply more ink droplets onto a recording medium within a unit time, forming an image at higher speed than is possible with the conventional ink-jet printer.

The second embodiment is further advantageous. As indicated above, the toner particles 55 are isolated from the carrier liquid 57 at the same time they are made to agglomerate in the apical part of the ink meniscus 54 formed at the distal end 32*a* of the recording electrode 32. Namely, the toner particles 55 agglomerate and the carrier liquid 57 is discharged efficiently and reliably, whereby the droplet 58 flying from the electrode 32 consists of a large toner agglomeration 56 and a small amount of carrier liquid 57 barely enough to wet the toner 55. As a result, the ink droplet 58 forms, on the recording medium, a dot which neither bleeds nor flows, and an image of high quality is formed on the recording medium. If the toner particles 55 could not efficiently agglomerate or could not be fully separated from the carrier liquid, the ink droplet 57 would consist of less toner 55 and more carrier liquid, inevitably forming a dot which bleeds and flows. It would then be impossible for the second embodiment to form high-quality images. In particular, if the toner particles 55 could not efficiently agglomerate, it would take a longer time to form an ink droplet, decreasing the recording cycle and ultimately reducing the recording speed.

Ink-jet printers which are the third to tenth embodiments of the invention and which are modifications of the second embodiment will be described in FIGS. 10A to 25C. In these figures, the components similar or identical to those of the second embodiments are designated at the same reference numerals since the third to tenth embodiments are the same as the second embodiment in structure, except for the recording electrodes. The recording electrodes of each of these embodiments will be explained below in detail.

Figure 10A:
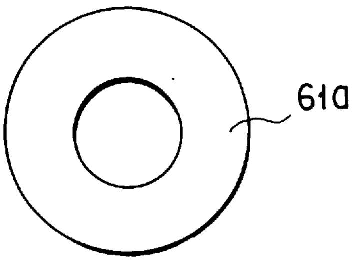
FIG. 10A is a plan view of recording electrode incorporated in an image forming apparatus according to a third embodiment of the present invention.
Figure 10B:
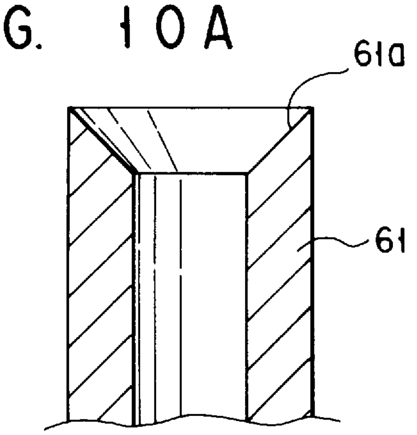
FIG. 10B is a sectional view of the electrode shown in FIG. 10A.

FIG. 10A and 10B shows one of the identical recording electrodes 61 incorporated in the ink-jet printer according to the third embodiment. As shown in FIG. 1OA and 10B, the recording electrode 61 is a hollow cylinder. It has an inner diameter of 500 $\mu$m, an outer diameter of 1 mm and a length of 10 mm. The distal end 61*a* of the electrode 61 is tapered at 45° to the outer circumferential surface, inclining down from the outer circumferential surface to the inner circumferential surface.

Figure 11:
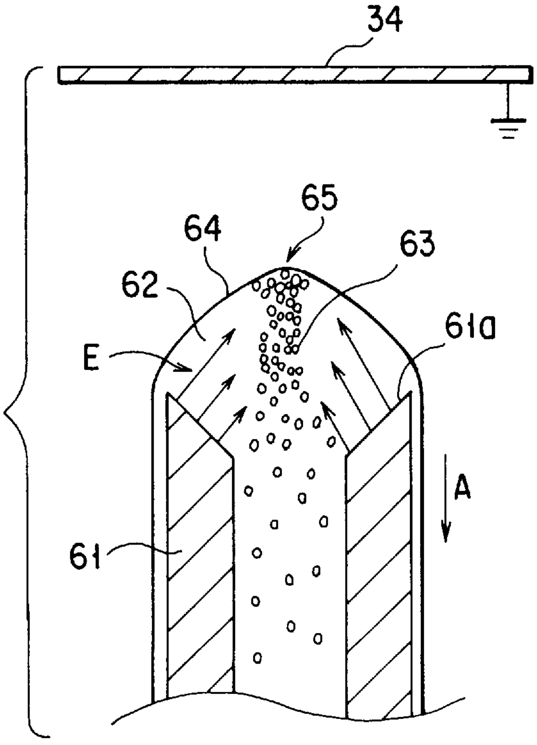
FIG. 11 is a diagram explaining how ink behaves when a drive voltage (FIG. 8) is applied to the recording electrode illustrated in FIG. 10.

FIG. 11 explains how ink behaves at the distal end 61*a* of the recording electrode 61 when a bias voltage (FIG. 8) is applied to the electrode 61. The ink consists of carrier liquid 62 and toner 63 dispersed in the liquid 62.

As seen from FIG. 11, an intense electric field E is generated at the distal end 61*a* of the electrode 61 when the bias voltage Vb is applied to the recording electrode 61. The electric field E extends in the direction of arrows E. More precisely, the electric field extends upwards toward the axis of the electrode 61 because the distal end 61*a* of the electrode 61 is tapered as described above. The electric field E causes the toner particles 63 to migrate in the ink meniscus 54 toward the axis of the recording electrode 61 immediately after they reach the tapered distal end 61*a* of the electrode 61. The toner particles 63 gradually concentrate at the axis of the recording electrode 61, forming a toner agglomeration 65 in the apical part of the ink meniscus 64 formed at the distal end 61*a.* In other words, the toner particles 63 are isolated from the carrier liquid 62 at the distal end 61*a* of the recording electrode 61.

The toner agglomeration 65 thus formed is stably held in the apical part of the ink meniscus 64, thanks to the electric field E and the flow of the ink. When a recording voltage Vc is applied to the electrode 61 in this condition, an ink droplet containing the toner agglomeration 65 flies from the ink meniscus 64 toward a counter electrode 34.

The carrier liquid 62 which constitutes the ink, together with the toner 63, is electrically insulating and not influenced by the electric field E at all. Therefore, the liquid 62 spills over the distal end 61*a* of the recording electrode 61. It then flows down in the direction of arrow A, along the outer circumferential surface of the recording electrode 61.

The distal end 61*a* of the electrode 61, which is tapered as shown in FIG. 10B, serves to isolate the toner particles 63 from the carrier liquid 62 and causes the particles 63 to agglomerate in the apical part of the ink meniscus 64, more efficiently than in the ink jet printer according to the second embodiment of the invention.

Figure 12A:
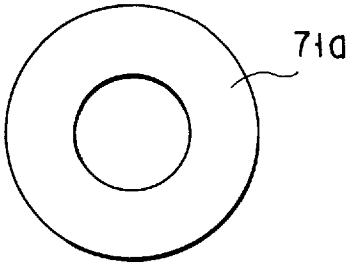
FIG. 12A is a plan view of recording electrode incorporated in an image forming apparatus according to a fourth embodiment of the present invention.
Figure 12B:
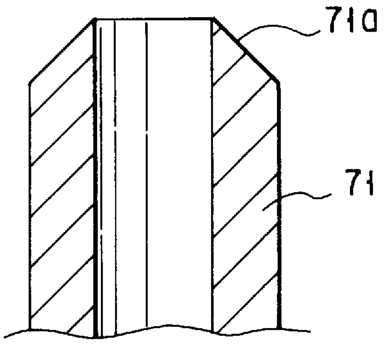
FIG. 12B is a sectional view of the electrode shown in FIG. 12A.

FIGS. 12A and 12B shows one of the identical recording electrodes 71 incorporated in the ink-jet printer according to the fourth embodiment. As illustrated in FIGS. 12A and 12B, the recording electrode 71 is a hollow cylinder. The electrode 71 has an inner diameter of 500 $\mu$m, an outer diameter of 1 mm and a length of 10 mm. The distal end 71*a* of the electrode 71 is tapered at 45° to the inner circumferential surface, inclining up from the outer circumferential surface to the inner circumferential surface.

Figure 13:
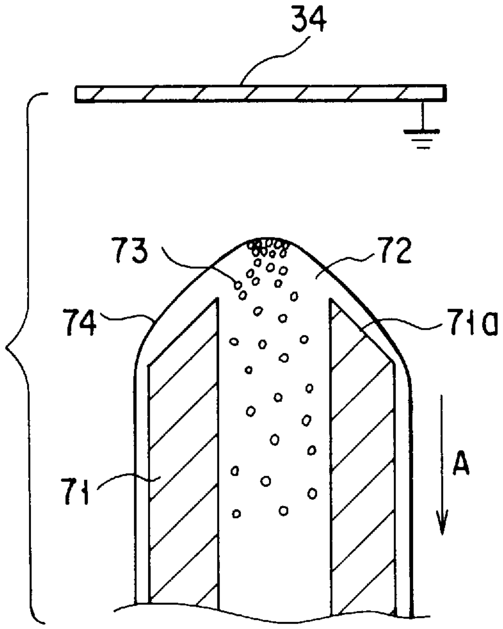
FIG. 13 is a diagram explaining how ink behaves when a drive voltage (FIG. 8) is applied to the recording electrode shown in FIG. 12B.

FIG. 13 explains how ink behaves at the distal end 71*a* of the recording electrode 71 when a bias voltage (FIG. 8) is applied to the electrode 71. The ink consists of carrier liquid 72 and toner 73 dispersed in the liquid 72.

As is shown in FIG. 13, a leakage electric field is generated in the electrode 71 when the bias voltage Vb is applied to the recording electrode 71. The leakage electric field causes the toner particles 73 to migrate toward the axis of the recording electrode 71. The toner particles 73 are thereby isolated from the carrier liquid 72 in the apical part of the ink meniscus 74 formed at the distal end 71*a* of the electrode 71. The carrier liquid 72 containing no toner particles spills over the distal end 71*a* of the electrode due to the pressure which supplies the ink upwards, and then flows down in the direction of arrow A, along the outer circumferential surface of the recording electrode 71.

The tapered distal end 71*a* of the electrode 71 and the outer circumferential surface thereof define an obtuse angle. Therefore, the distal end 71*a* of the electrode 71 would not vibrate as the carrier liquid 72 spills over the distal end 71*a* onto the outer circumferential surface of the recording electrode 71. In this regard it should be noted that, as known in the art, liquid generally vibrates as it flows over a corner of a rigid body, at the frequency determined by the wettability the liquid has with respect to the rigid body and by the shape of that corner. If the corner has an obtuse angle as in the fourth embodiment, the liquid can smoothly flow over the corner, not vibrating the the rigid body at all.

Thus, in the fourth embodiment, the recording electrode 71 does not vibrate as the carrier liquid 72 spills over its distal end 71*a* and flows down along its outer circumferential surface. As a result, the ink meniscus 74 on the distal end 71*a* scarcely vibrate. This helps to form images of high quality.

Figure 14A:
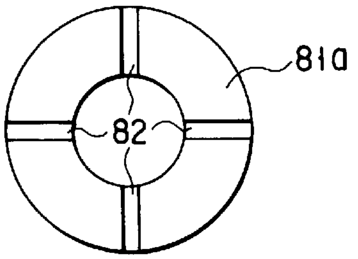
FIG. 14A is a plan view of recording electrode incorporated in an image forming apparatus according to a fifth embodiment of the present invention.
Figure 14B:
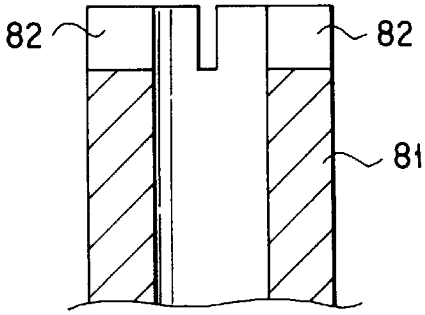
FIG. 14B is a sectional view of the electrode shown in FIG. 14A.

One of the identical recording electrodes 81 incorporated in the ink-jet printer according to the fifth embodiment will be described, with reference to FIGS. 14A, 14B and 15.

As shown in FIG. 14, the recording electrode 81 is a hollow cylinder. The electrode 81 has an inner diameter of 500 μm, an outer diameter of 1 mm and a length of 10 mm. The electrode 81 has four grooves 82 cut in the distal end 81*a*. The grooves 82 are spaced apart at regular intervals along the circumference. They extend from the outer circumferential surface of the electrode 81 to the inner circumferential surface thereof. Each groove 82 is 100 μm wide and 200 μm deep.

Figure 15:
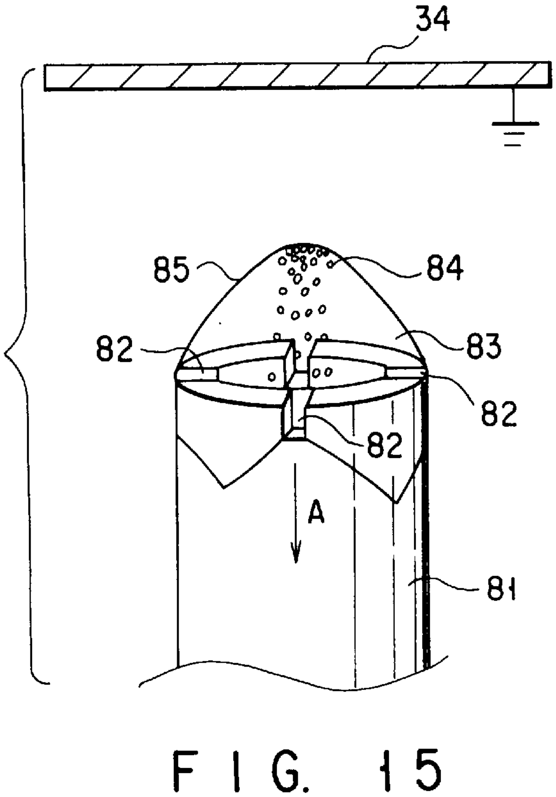
FIG. 15 is a diagram explaining how ink behaves when a drive voltage (FIG. 8) is applied to the recording electrode shown in FIG. 14B.

FIG. 15 explains how ink behaves at the distal end 81*a* of the recording electrode 81 when a bias voltage (FIG. 8) is applied to the electrode 81. The ink consists of carrier liquid 83 and toner 84 dispersed in the liquid 83.

As FIG. 15 shows, a leakage electric field is generated in the electrode 81 when the bias voltage Vb is applied to the recording electrode 81. The leakage electric field causes the toner particles 84 to migrate toward the axis of the recording electrode 81, in an ink meniscus 85 formed at the distal end 81*a* of the electrode 81. The toner particles 84 are thereby isolated from the carrier liquid 83 in the ink meniscus 85.

The sum of the widths of the grooves 82 cut in the distal end 81*a* of the recording electrode 81 is much less than the inner circumference of the electrode 81. The grooves 82 are spaced apart equidistantly, one form another, along the inner circumference of the electrode 81. Hence, the grooves 82 scarcely disturbs the electric field generated at the distal end 81*a* of the recording electrode 81. After isolated from the toner particles 84, a greater part of the carrier liquid 83 flows through the grooves 82 and then downwards in the direction of arrow A, along the outer circumferential surface of the recording electrode 81.

In the fifth embodiment, the apical part of the ink meniscus 85 scarcely vibrate as the carrier liquid 83 isolated from the toner 84 flows trough the grooves 82. The ink meniscus 85 can therefore be held stably.

One of the identical recording electrodes 91 incorporated in the ink-jet printer according to the sixth embodiment will be described, with reference to FIGS. 16 and 17.

Figure 16:
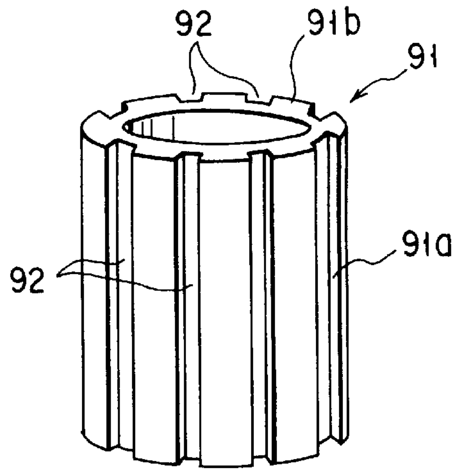
FIG. 16 is a perspective view of recording electrode incorporated in an image forming apparatus according to a sixth embodiment of this invention.

As seen from FIG. 16, the recording electrode 91 is a hollow cylinder. The electrode 91 has an inner diameter of 500 μm, an outer diameter of 1 mm and a length of 10 mm. The electrode 91 has narrow vertical grooves 92 cut in its outer circumferential surface 91*a*, each extending from the distal end 91*b* to the proximal end. The grooves 92 have a width about 10 μm and are spaced apart at regular intervals along the outer circumferential surface 91*a* of the electrode 91.

Figure 17:
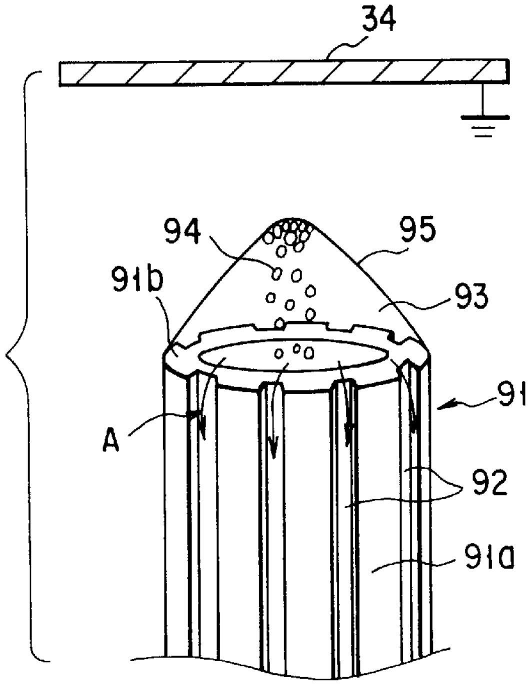
FIG. 17 is a diagram explaining how ink behaves when a drive voltage (FIG. 8) is applied to the recording electrode illustrated in FIG. 16.

FIG. 17 explains how ink behaves at the distal end 91*b* of the recording electrode 91 when a bias voltage (FIG. 8) is applied to the electrode 91. The ink consists of carrier liquid 93 and toner 94 dispersed in the liquid 93.

As can be understood from FIG. 17, a leakage electric field is generated in the electrode 91 when the bias voltage Vb is applied to the recording electrode 91. The leakage electric field causes the toner particles 94 to migrate toward the axis of the recording electrode 91, in an ink meniscus 95 formed at the distal end 91*b* of the electrode 91. The toner particles 94 are thereby isolated from the carrier liquid 93 in the ink meniscus 95. After isolated from the toner particles 94, a greater part of the carrier liquid 93 flows down through the vertical grooves 92, by virtue of the capillary action of the grooves 92.

In the sixth embodiment, the carrier liquid 93 isolated from the toner particles 94 is forced downwards due to the capillary action of the vertical grooves 92 cut in the outer circumferential surface 91*a* of the electrode 91. Therefore, the apical part of the ink meniscus 95 scarcely vibrate as the carrier liquid 93 flows downwards. The ink meniscus 95 can therefore be held stably. Moreover, the carrier liquid 93 neither make turbulence nor accumulate in the grooves 92, because of the capillary action which the grooves 92 perform. The carrier liquid 93 can thus be discharged with high efficiency.

One of the identical recording electrodes 101 incorporated in the ink-jet printer according to the seventh embodiment will be described, with reference to FIGS. 18A and 18B and FIGS. 19A to 19C.

Figure 18A:
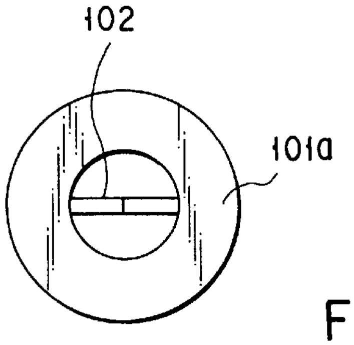
FIG. 18A is a plan view of recording electrode incorporated in an image forming apparatus according to a seventh embodiment of the present invention.
Figure 18B:
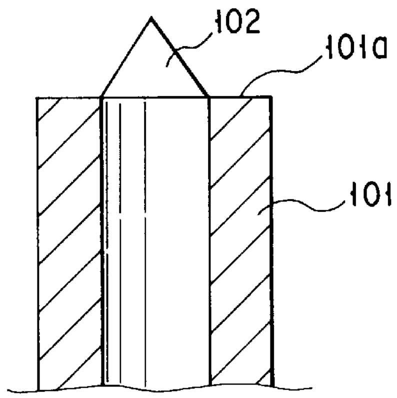
FIG. 18B is a sectional view of the electrode shown in FIG. 18A.

As shown in FIG. 18A and 18B, the recording electrode 101 is a hollow cylinder. The electrode 101 has an inner diameter of 500 μm, an outer diameter of 1 mm and a length of 10 mm. The electrode 101 has an electrically insulating a projection 102, which extends upwards from the distal end 101*a* of the electrode 101 and which is positioned with its the apex located on the axis of the electrode 101. The projection 102 is shaped like an isosceles triangle. It is 100 μm thick, 500 μm tall and 500 μm long at the base.

How the ink behaves at the distal end 101*a* of the recording electrode 101 when a drive voltage (FIG. 8) is applied to the electrode 101 will be explained, with reference to FIGS. 19A to 19C. The ink consists of carrier liquid 103 and toner 104 dispersed in the liquid 103.

Figure 19A:
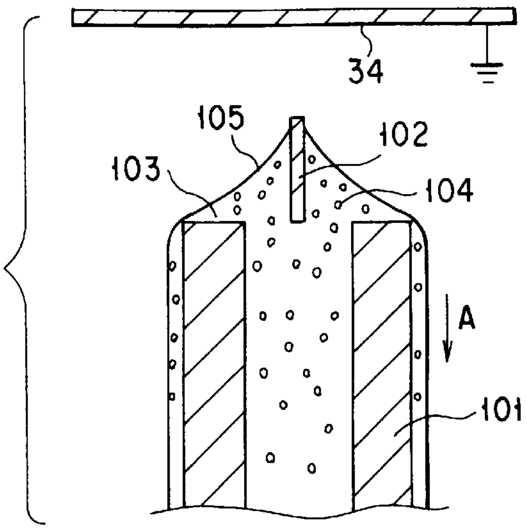
FIGS. 19A to 19C are diagrams explaining how ink behaves when a drive voltage (FIG. 8) is applied to the recording electrode shown in FIG. 18B.
Figure 19B:
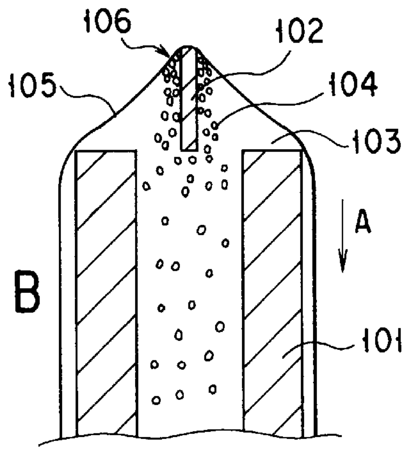
Figure 19C:
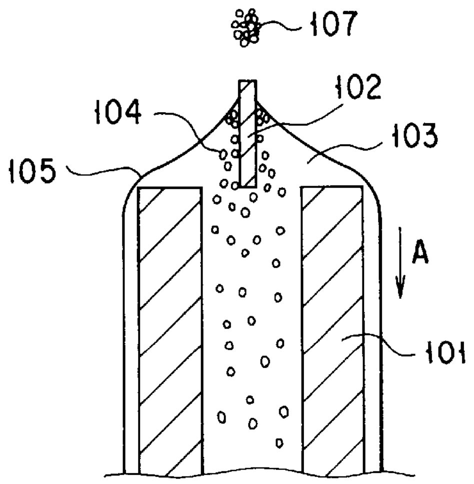

No drive voltage is applied to the electrode 101 as shown in FIG. 19A. In this condition, the ink rises in the recording electrode 101 and spills over the distal end 101*a* of the electrode 101 at a constant rate, flowing down in the direction of arrow A, along the outer circumferential surface of the electrode 101. The ink forms a meniscus 105 at the distal end 110*a* of the electrode 101. The ink meniscus 105 has a shape and size which are determined by the ink-supplying pressure, the height of the projection 102, the ink-wettability of the projection 102, the surface tension of the ink, and the like.

In the seventh embodiment, the pressure at which the ink is supplied is adjusted so that the apex of the ink meniscus 105 may be at a position about 100 μm below the apex of the triangular projection 102. In the condition of FIG. 19A where no drive voltage is applied to the electrode 101, no electrostatic force acts on the toner 104 in the ink. Thus, the toner particles 104 are uniformly dispersed in the ink.

When a bias voltage Vb is applied to the electrode 101, a leakage electric field is generated in the electrode 101. As shown in FIG. 19B, the leakage electric field results in an electric field in the vicinity of the distal end 101*a* of the recording electrode 101. This electric field extends toward the axis of the electrode 101, causing the toner particles 104 to migrate in the ink meniscus 105 toward the axis of the electrode 101.

That component of the electric field which extends toward the axis of the electrode 101 makes the toner particles 104 agglomerate near the apex of the triangular projection 102. The projection 102 is made of an electircally insulating resin which has a small dielectric constant. The projection 102 would not disturb the electric field generated near the distal end 101*a* of the recording electrode 101. Hence, the toner 104 is stably held in the apical part of the ink meniscus 105, by virtue of the electric field which extends toward a counter electrode 34.

The more the toner particles 104 agglomerate in the apical part of the meniscus 105, the more does increase the electrostatic force which acts on the toner particles 104 toward the counter electrode 34. The apical part of the ink meniscus 105 therefore swells toward the counter electrode 34, covering the the apex of the triangular projection 102. The electrostatic force on the toner 104 is not strong so as to overcome the surface tension of the ink. It follows that no portion of the ink would fly, separated from the ink meniscus 105 which contains a toner agglomeration 106.

Not electrically charged, the carrier liquid 103 is not influenced by the electric field at all. The liquid 103 therefore spills over the distal end 101*a* of the recording electrode 101. It then flows down vertically, or in the direction of arrow A, along the outer circumferential surface of the recording electrode 101. At this time the ink meniscus 105 remains stable because the projection 102 can be wet with the ink and also because the surface tension of the ink balances with the pressure at which the ink flows through the recording electrode 101. The ink-wettability of the projection 102 and the balance between the surface tension of the ink and the ink-supplying pressure remain unchanged while the ink-jet printer according to this embodiment is forming an image on a recording medium (not shown). The ink meniscus 105 is thereby held stable at all times.

When a recording voltage Vc is applied to the electrode 101 in this condition, the electrostatic force acting on the toner agglomeration 106 in the apical part of the ink meniscus 105 overcomes the surface tension of the ink. An ink droplet 107 therefore flies from the meniscus 105 toward the counter electrode 34 as is illustrated in FIG. 19C.

As soon as the ink droplet 107 is applied onto the recording medium, forming an ink dot thereon, the potential of the recording electrode 101 is changed back to the bias voltage Vb within the recording cycle. The ink meniscus 105 is then fast brought back to the condition shown in FIG. 19B.

The seventh embodiment is characterized in that recording electrode 101 has an insulating projection 102 at its distal end 101*a*. The projection 102 minimizes the vibration of the ink meniscus 105 immediately before the ink droplet 107 flies. The ink droplet 107 can therefore fly stably and reliably. Moreover, the projection 102 brings the ink meniscus 105 back to the condition (FIG. 19B) right after the ink droplet 107 flies from the meniscus 105.

One of the identical recording electrodes 111 incorporated in the ink-jet printer according to the eighth embodiment of the invention will be described, with reference to FIGS. 20A and 20B and FIGS. 21A to 21C.

Figure 20A:
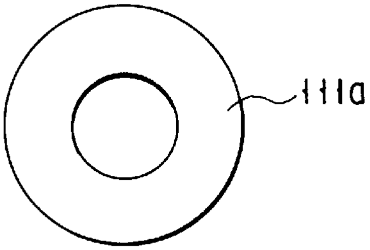
FIG. 20A is a plan view of recording electrode incorporated in an image forming apparatus according to an eighth embodiment of this invention.
Figure 20B:
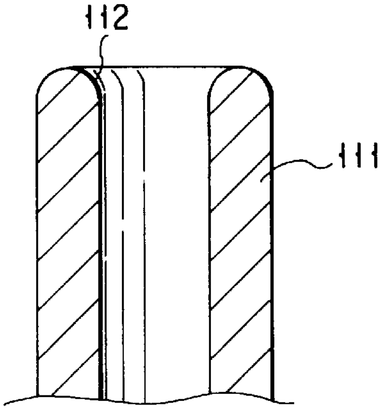
FIG. 20B is a sectional view of the electrode shown in FIG. 20A.

As shown in FIGS. 20A and 20B, the recording electrode 111 is a hollow cylinder. The electrode 111 has an inner diameter of 500 μm, an outer diameter of 1 mm and a length of 10 mm. The distal end 111*a* of the electrode 111 is a rounded rim 112. Namely, the distal end 111*a* defines a convex which extends between the outer and inner circumferential surfaces of the electrode 111 and which has its apex located at the midpoint between the circumferential surfaces. The rounded rim 112 has a radius of curvature of 125 μm.

How the ink behaves at the distal end 111*a* of the recording electrode 111 when a drive voltage (FIG. 8) is applied to the electrode 111 will be explained, with reference to FIGS. 21A to 21C. The ink consists of carrier liquid 113 and toner 114 dispersed in the liquid 113.

Figure 21A:
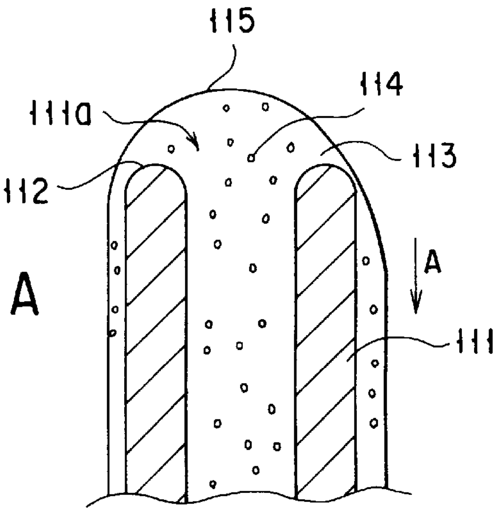
FIGS. 21A to 21C are diagrams explaining how ink behaves when a drive voltage (FIG. 8) is applied to the recording electrode shown in FIG. 20B.
Figure 21B:
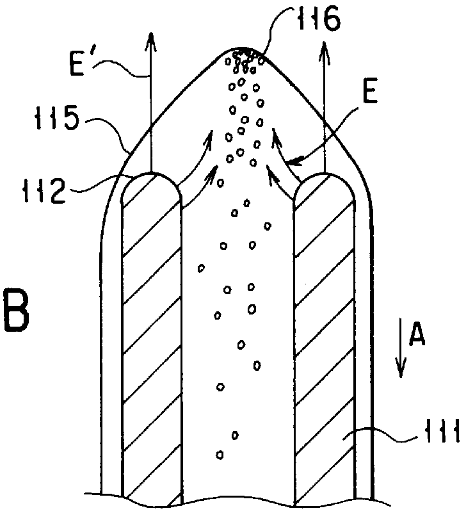
Figure 21C:
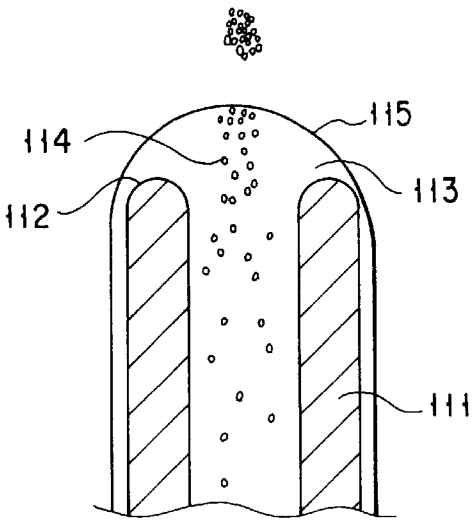

As long as no drive voltage is applied to the electrode 111, the ink rises in the recording electrode 111 and spills over the distal end 111*a* of the electrode 111 at a constant rate, flowing down in the direction of arrow A along the outer circumferential surface of the electrode 111—as is illustrated in FIG. 21A. The ink forms a meniscus 115 at the distal end 111*a* of the electrode 111. In this condition, toner particles 114 are uniformly dispersed in the carrier liquid 113.

When a bias voltage Vb is applied to the electrode 111, an intense leakage electric field E is generated in vicinity of the electrode 111 as in the third embodiment. As shown in FIG. 21B, the leakage electric field E extends toward the axis of the electrode 111, or in the direction of arrows E. As soon as the toner particles 114 rising in the electrode 111 reach the rounded rim 112, they start migrating toward the axis of the electrode 11 due to the electric field E. The toner particles 114 gradually agglomerate at the axis of the electrode 111 as they move upwards in the ink meniscus 115. The toner particles 114 are isolated from the carrier liquid 113 at a position near the apex of the ink meniscus 115, forming a toner agglomeration 116.

The toner agglomeration 116 moves toward the apex of the ink meniscus 115, compelled by the carrier liquid 113 flowing toward a counter electrode 34 and the electric field E extending to the axis of the recording electrode 111. The agglomeration 116 is held or trapped in the apical part of the ink meniscus 115 due to a relatively intense electric field E' which extends from the distal end 111*a* of the electrode 111 toward the counter electrode 34.

Not electrically charged, the carrier liquid 113 is not influenced by the electric field E at all. The liquid 113 therefore spills over the distal end 111*a* of the recording electrode 111. It then flows down vertically, or in the direction of arrow A, along the outer circumferential surface of the recording electrode 111. At this time, the ink meniscus 115 remains stable because the distal end 111*a* has no corners having an acute angle. Should the distal end 111*a* have such a corner, the electric field generated between the end 111*a* and the counter electrode 34 would concentrate in the corner, resulting in an electric field so intense as to cause corona discharge and hence to electrically charge the carrier liquid 113. If the carrier liquid 113 were so charged, it would be influenced by the electric field, too, and could not smoothly spill over the distal end 111*a* of the electrode 111. In this embodiment, the carrier liquid 113 can smoothly spill over the distal end 111*a* of the electrode 111 since the distal end 111*a* has no corner having an acute angle, not applying an unnecessary electric charge to the carrier liquid 113.

One of the identical recording electrodes 121 incorporated in the ink-jet printer according to the ninth embodiment of the invention will be described, with reference to FIGS. 22A and 22B and FIGS. 23A to 23C.

Figure 22A:
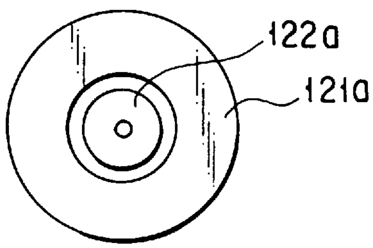
FIG. 22A is a plan view of recording electrode incorporated in an image forming apparatus according to a ninth embodiment of the present invention.
Figure 22B:
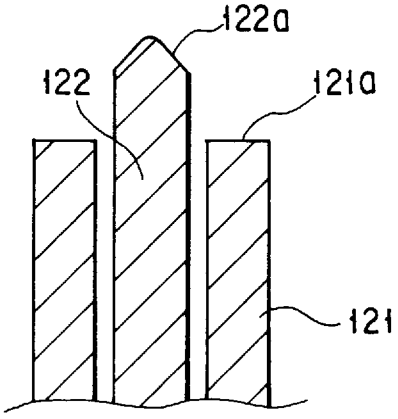
FIG. 22B is a sectional view of the electrode shown in FIG. 22A.

As shown in FIGS. 22A and 22B, the recording electrode 121 is a hollow cylinder. Like the recording electrodes 32 used in the first embodiment, the electrode 121 has an inner diameter of 500 μm, an outer diameter of 1 mm and a length of 10 mm. A columnar, electrically insulating projection 122 is provided in the recording electrode 121, positioned coaxial with the electrode 121 and not contacting the electrode 121. The projection 122 has a diameter of 400 μm. It has a conical distal end 122*a*. The distal end 122*a* has a rounded tip which has a radius of curvature of 100 μm. The projection 122 protrudes from the distal end 121*a* of the electrode 121 toward a counter electrode, for a distance of about 500 μm.

How the ink behaves at the distal end 121*a* of the recording electrode 121 when a drive voltage (FIG. 8) is applied to the electrode 121 will be explained, with reference to FIGS. 23A to 23C. The ink consists of carrier liquid 123 and toner 124 dispersed in the liquid 123.

Figure 23A:
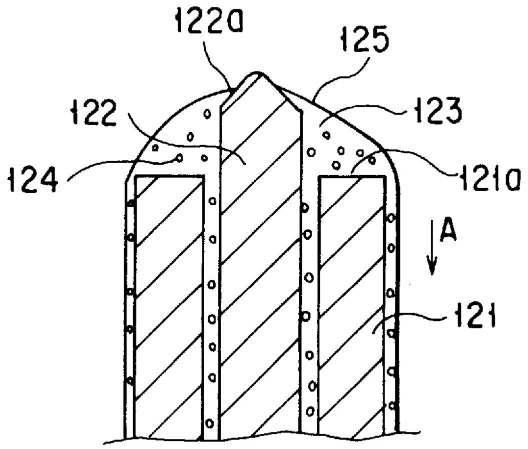
FIGS. 23A to 23C are diagrams explaining how ink behaves when a drive voltage (FIG. 8) is applied to the recording electrode illustrated in FIG. 22B.
Figure 23B:
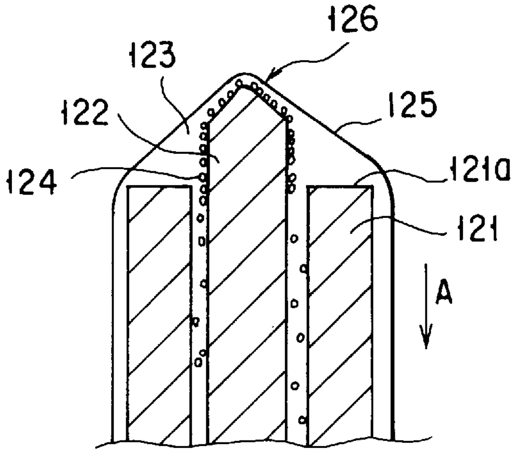
Figure 23C:
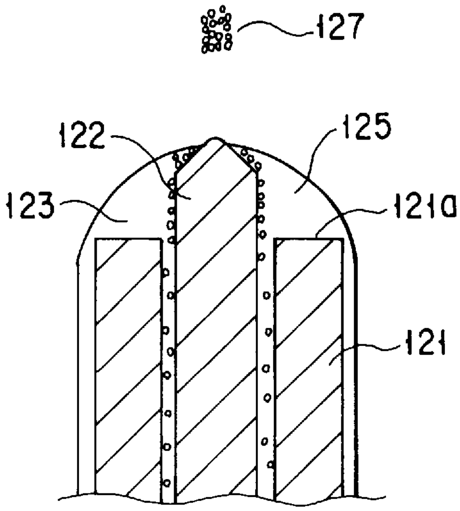

As long as no drive voltage is applied to the electrode 121, the ink rises between the inner surface of the recording electrode 121 and the outer surface of the projection and spills over the distal end 121*a* of the electrode 121 at a constant rate, flowing down in the direction of arrow A along the outer circumferential surface of the electrode 121, as is illustrated in FIG. 23A. The ink forms a meniscus 125 near the distal end 121*a* of the electrode 121. The ink meniscus 125 has a shape and size which are determined by the ink-supplying pressure, the height of the projection 122, the surface tension of the ink, the ink-wettability of the projection 122, and the like.

In the ninth embodiment, the ink-supplying pressure is adjusted such that the ink meniscus 125 has its apex located about 100 μm below the tip of the projection 122. While no drive voltage is being applied to the recording electrode 121 (FIG. 23A), no electrostatic force acts on the toner 124. In this condition, the toner particles 124 are uniformly dispersed in the carrier liquid 123.

When a bias voltage Vb is applied to the electrode 121, a leakage electric field is generated in the electrode 121. As shown in FIG. 23B, the leakage electric field results in an electric field in the vicinity of the distal end 121*a* of the recording electrode 121. This electric field extends toward the axis of the electrode 121, making the toner particles 124 migrate in the ink meniscus 125 toward the axis of the electrode 121.

That component of the electric field which extends toward the counter electrode 34 makes the toner particles 124 agglomerate near the apex of the projection 122. The projection 122 is made of an electircally insulating resin which has a small dielectric constant. The projection 122 would not disturb the electric field generated near the distal end 121*a* of the recording electrode 121. Hence, the toner 124 is stably held in the apical part of the ink meniscus 125, by virtue of the electric field which extends toward the counter electrode 34.

The more the toner particles 124 agglomerate in the apical part of the meniscus 125, the more does increase the electrostatic force which acts on the toner particles 124 toward the counter electrode 34. The apical part of the ink meniscus 125 therefore swells toward the counter electrode 34, covering the the apex of the columnar projection 122. The electrostatic force on the toner 124 is not strong so as to overcome the surface tension of the ink. It follows that no portion of the ink would fly, separated from the ink meniscus 125 which contains a toner agglomeration 126.

Not electrically charged, the carrier liquid 123 is not influenced by the electrode field at all. The liquid 123 therefore spills over the distal end 121*a* of the recording electrode 121. It then flows down vertically, or in the direction of arrow A, along the outer circumferential surface of the recording electrode 121. At this time, the ink meniscus 125 remains stable because the projection 122 can be wet with the ink and also because the surface tension of the ink balances with the pressure at which the ink flows through the recording electrode 121.

Since the projection 122 is coaxial with the recording electrode 121, the ink meniscus 125 is stable, completely covering the recording electrode 121, and the carrier liquid 123 can be smoothly discharged. The ink-wettability of the projection 122 and the balance between the surface tension of the ink and the ink-supplying pressure remain unchanged while the ink-jet printer according to the ninth embodiment is forming an image on a recording medium (not shown). The ink meniscus 125 is thereby held stable at all times.

When a recording voltage Vc is applied to the electrode 121 in this condition, the electrostatic force acting on the toner agglomeration 126 in the apical part of the ink meniscus 125 overcomes the surface tension of the ink. An ink droplet 127 therefore flies from the meniscus 125 toward the counter electrode 34 as is illustrated in FIG. 23C.

As soon as the ink droplet 127 is applied onto the recording medium, forming an ink dot thereon, the potential of the recording electrode 121 is changed back to the bias voltage Vb within the recording cycle. The ink meniscus 125 is then fast brought back to the condition shown in FIG. 23B.

The ninth embodiment is characterized in that a columnar projection 122 is provided in the recording electrode 121 and positioned coaxial therewith, with its upper end portion protruding from the distal end 121*a* of the electrode 121. The upper end portion of the projection 122 absorbs the vibration of the ink meniscus 125, preventing the meniscus 125 from vibrating as in the seventh embodiment. Furthermore, the projection 122 is coaxial with the recording electrode 121. The columnar projection 122 holds the meniscus 125 stably in the form of a hemisphere at the distal end 121*a* of the recording electrode 121. As a result, the ninth embodiment can apply ink droplets toward the counter electrode in the same direction, thereby to form a high-quality image on the recording medium.

One of the identical recording electrodes 131 incorporated in the ink-jet printer according to the tenth embodiment of the invention will be described, with reference to FIGS. 24A and 24B and FIGS. 25A to 25C.

Figure 24A:
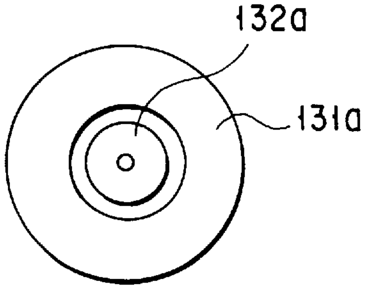
FIG. 24A is a plan view of recording electrode incorporated in an image forming apparatus according to a tenth embodiment of this invention.
Figure 24B:
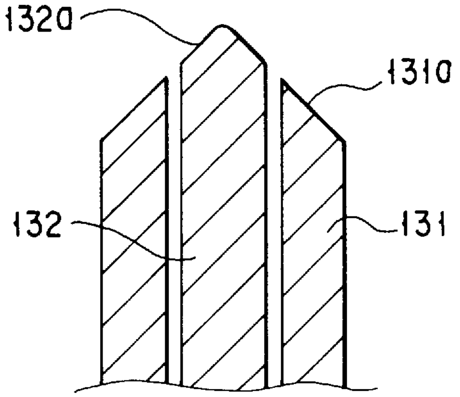
FIG. 24B is a sectional view of the electrode shown in FIG. 24A.

As shown in FIGS. 24A and 24B, the recording electrode 131 is a hollow cylinder. Like the recording electrodes 71 used in the fourth embodiment, the electrode 131 has an inner diameter of 500 μm, an outer diameter of 1 mm and a length of 10 mm. The electrode 131 has a distal end 131*a* which is tapered and inclines up from the outer circumferential surface to the inner circumferential surface. As in the ninth embodiment, a columnar, electrically insulating projection 132 is provided in the recording electrode 131, positioned coaxial with the electrode 131 and not contacting the electrode 131.

In the tenth embodiment, the distal end 131*a* of the electrode 131 defines an angle of 30° with the inner circumferential surface. The columnar projection 132 has a diameter of 400 μm. It has a conical distal end 132*a*, which has an angle of 60° and a rounded tip having a radius of curvature of 100 μm. The projection 132 is provided in the recording electrode 131, with its conical distal end 132*a* located flush with the tapered distal end 131*a* of the electrode 131.

Figure 25A:
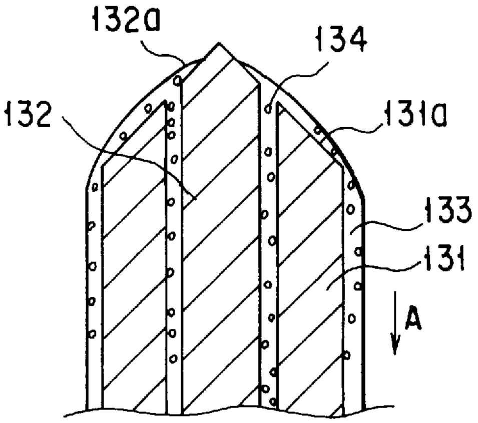
FIGS. 25A to 25C are diagrams explaining how ink behaves when a drive voltage (FIG. 8) is applied to the recording electrode shown in FIG. 24B.
Figure 25B:
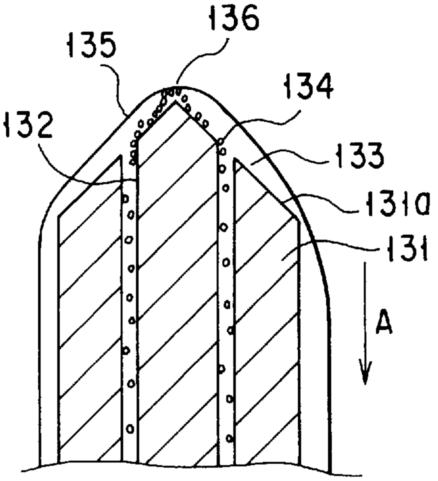
Figure 25C:
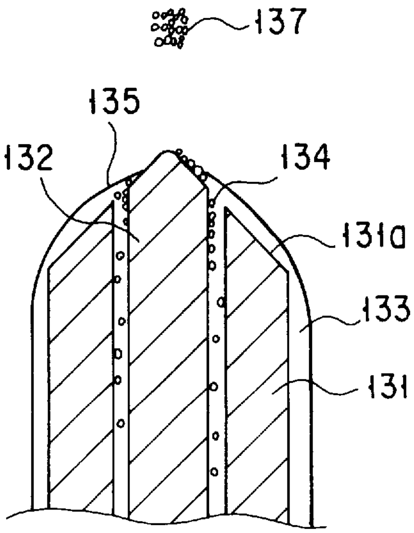

How the ink behaves at the distal end 131*a* of the recording electrode 131 when a drive voltage (FIG. 8) is applied to the electrode 131 will be explained, with reference to FIGS. 25A to 25C. The ink consists of carrier liquid 133 and toner 134 dispersed in the liquid 133.

As long as no drive voltage is applied to the electrode 131, the ink rises in the gap between the inner circumferential surface of the electrode 131 and the columnar projection 132. The ink then spills over the distal end 131*a* of the electrode 131 at a constant rate, flowing down in the direction of arrow A along the outer circumferential surface of the electrode 131, as is illustrated in FIG. 25A. The ink forms a meniscus 135 at the distal end 131*a* of the electrode 131. The ink meniscus 135 has a shape and size which are determined by the ink-supplying pressure, the height of the projection 132, the surface tension of the ink, the ink-wettability of the projection 132, the tip-angle of the projection 132, the angle of the distal end 131*a* of the electrode 131, and the like.

In the tenth embodiment, the ink-supplying pressure is adjusted such that the ink meniscus 135 has its apex located about 100 $\mu$m below the tip of the projection 132. While no drive voltage is being applied to the recording electrode 131 (FIG. 25A), no electrostatic force acts on the toner 134. In this condition, the toner particles 134 are uniformly dispersed in the carrier liquid 133.

When a bias voltage Vb is applied to the electrode 131, a leakage electric field is generated in the electrode 131. As shown in FIG. 25B, the leakage electric field results in an electric field in the vicinity of the distal end 131*a* of the recording electrode 131. This electric field extends toward the axis of the electrode 131, making the toner particles 134 migrate in the ink meniscus 135 toward the columnar projection 132 provided in the electrode 131 and located coaxial therewith.

That component of the electric field which extends toward the counter electrode 34 makes the toner particles 134 agglomerate near the apex of the projection 132. Made of an electircally insulating resin having a small dielectric constant, the columnar projection 132 would not disturb the electric field generated near the distal end 131*a* of the recording electrode 131. Hence, the toner 134 is stably held or trapped in the apical part of the ink meniscus 135, by virtue of the intense electric field which extends toward the counter electrode 34.

The more the toner particles 134 agglomerate in the apical part of the meniscus 135, the more does increase the electrostatic force which acts on the toner particles 134 toward the counter electrode 34. The apical part of the ink meniscus 135 therefore swells toward the counter electrode 34, covering the the apex of the columnar projection 132. The electrostatic force on the toner 134 is not strong so as to overcome the surface tension of the ink. It follows that no portion of the ink would fly, separated from the ink meniscus 135 which contains a toner agglomeration 136. In other words, no ink droplet containing the agglomeration 136 does not fly from the ink meniscus 135.

Not electrically charged, the carrier liquid 133 is not influenced by the electrode field at all. The liquid 133 therefore spills over the distal end 131*a* of the recording electrode 131. It then flows down vertically, or in the direction of arrow A, along the outer circumferential surface of the recording electrode 131. At this time, the ink meniscus 135 remains stable because the projection 132 can be wet with the ink, because the distal end 131*a* of the electrode 131 and the columnar projection 132 are tapered, and because the surface tension of the ink balances with the pressure at which the ink flows through the recording electrode 131.

As described above, the projection 132 is coaxial with the recording electrode 131, and the tapered distal end 131*a* of the electrode is flush with the conical distal end 132*a* of the projection 132. The carrier liquid 133 can thus be smoothly discharged. Further, the ink-wettability of the projection 132 and the balance between the surface tension of the ink and the ink-supplying pressure remain unchanged while the ink-jet printer according to the ninth embodiment is forming an image on a recording medium (not shown). Therefore, the ink meniscus 135 is held stable at all times.

When a recording voltage Vc is applied to the electrode 131 in this condition, the electrostatic force acting on the toner agglomeration 136 in the apical part of the ink meniscus 135 overcomes the surface tension of the ink. An ink droplet 137 therefore flies from the meniscus 135 toward the counter electrode 34 as is shown in FIG. 25C.

As soon as the ink droplet 137 is applied onto the recording medium, forming an ink dot thereon, the potential of the recording electrode 131 is changed back to the bias voltage Vb within the recording cycle. The ink meniscus 135 is then fast brought back to the condition shown in FIG. 25B.

The tenth embodiment is characterized in that a columnar projection 132 is provided in the recording electrode 131 and positioned coaxial therewith, with its distal end 132*a* inclined and set in flush with the tapered distal end 131*a* of the electrode 131. The distal end portion of the projection 132 absorbs the vibration of the ink meniscus 135, preventing the meniscus 135 from vibrating as in the ninth embodiment. Furthermore, since the distal end 131*a* of the electrode 131 is tapered, the ink flowing over the distal end 131*a* onto the outer circumferential surface of the electrode 131 does not cause the distal end 131*a* to vibrate. Hence, the carrier liquid 133 can be smoothly discharged and the ink meniscus 135 can be held stably.

An ink-jet printer according to the eleventh embodiment of this invention will be described, with reference to FIG. 26 and FIGS. 27A and 27B and FIGS. 28A to 28C. This printer has a recording head 140. As seen from FIG. 26, the recording head 140 has a plurality of recording electrodes 131, only one of which is illustrated for the same of simplicity. The electrodes 131 are identical to those incorporated in the tenth embodiment.

As shown in FIG. 26, the recording head 140 has an electrically insulating substrate 143 which is substantially rectangular. The substrate 143 is hollow, having an ink-collecting chamber 143*a* in it. The recording electrode 131, which is a hollow cylinder, passes through the center part of the substrate 143. A pipe 145 protrudes upwards from the upper surface of the substrate 143. The pipe 143 has an inner diameter of 1.4 mm and an outer diameter of 2 mm. As shown in FIG. 27, the pipe 145 is coaxial with the electrode 131, surrounding that part of the electrode 131 which protrudes up from the upper surface of the substrate 143. The gap between that part of the electrode 131 and the pipe 145 communicates with the ink-collecting chamber 143*a* through an annular slit which is cut in the upper surface of the substrate 143. The pipe 145 has its distal end 145*a* positioned 0.5 mm below the distal end 131*a* of the electrode 131. Ink overflowing the distal end 131*a* can flow down into the ink-collecting chamber 143*a,* first through the gap between the electrode 131 and the pipe 145 and then through the annular slit.

As seen from FIG. 26, the electrode 131 is connected at its proximal end 131*b* to an ink-supplying tube 42, which in turn is connected to an ink-supplying tank 44. The ink-collecting clamber 143$a$ communicates with an ink-collecting tube 46. The ink-collecting tube 46 is connected to an ink-collecting tank 48.

In operation, the ink is supplied from the tank 44 to the recording electrode 131 via the ink-supplying tube 42. The ink spills over the distal end 131$a$ of the electrode 131 and flows down into the ink-collecting chamber 143$a$ through the gap between the electrode 131 and the pipe 145. The ink in the chamber 143$a$ is collected through the tube 46 into the ink-collecting tank 48.

A pulse generator 36 is connected to the recording head 140 to apply a drive voltage of a predetermined value to the recording electrode 131 and the pipe 145. The pulse generator 36 comprises a pulse voltage generating section 36$a$ and a DC voltage generating section 36$b$. The section 36$a$ generates a recording voltage Vc which is to be applied to the recording electrode 131. The section 36$b$ generates a bias voltage Vb to be applied to the recording electrode 131 and the pipe 145.

Figure 28A:
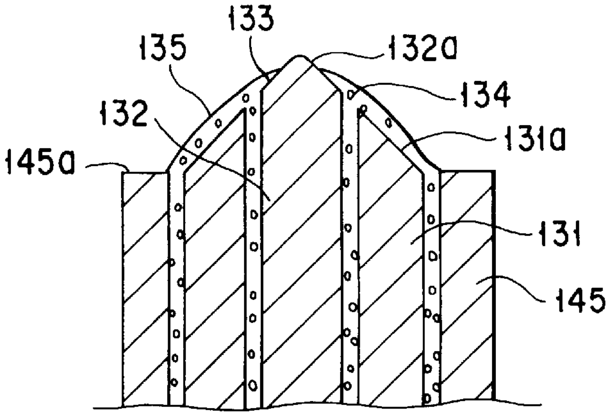
FIGS. 28A to 28C are diagrams explaining how ink behaves when a drive voltage (FIG. 8) is applied to the recording electrode illustrated in FIG. 27B.
Figure 28B:
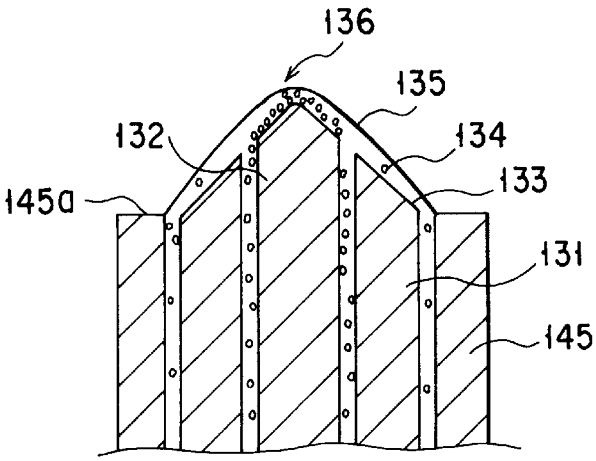
Figure 28C:
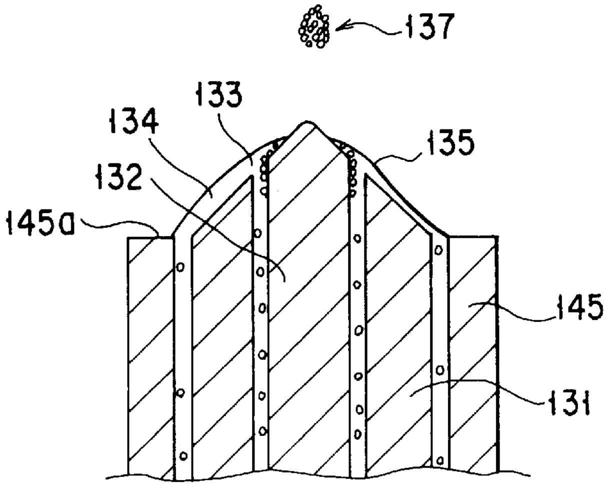

How the ink supplied to the recording electrode 131 behaves at the distal end 131$a$ of the electrode 131 when a drive voltage (FIG. 8) is applied from the pulse generator 36 to the electrode 131 and the pipe 145 will be explained, with reference to FIGS. 28A to 28C. It should be noted that the ink consists of carrier liquid 133 and toner 134 dispersed in the liquid 133.

As long as no drive voltage is applied to the electrode 131 and the pipe 145, the ink rises in gap between the electrode 131 and the columnar projection 132. The ink then spills over the distal end 131$a$ of the electrode 131 at a constant rate. As shown in FIG. 28A, the ink flows down into the ink-collecting chamber 143$a$ through the gap between the electrode 131 and the pipe 145. The ink forms a meniscus 135 at the distal end 131$a$ of the electrode 131. The ink meniscus 135 has a shape and size which are determined by the ink-supplying pressure, the height of the projection 132, the surface tension of the ink, the ink-wettability of the projection 132, the taper-angle of the distal end 131$a$ and of the projection 132, and the like.

In the eleventh embodiment, the ink-supplying pressure is adjusted such that the ink meniscus 135 has its apex located about 100 $\mu$m below the tip of the projection 132. While no drive voltage is being applied to the recording electrode 131 and the pipe 145 (FIG. 28A), no electrostatic force acts on the toner 134. In this condition, the toner particles 134 are uniformly dispersed in the carrier liquid 133.

When a bias voltage Vb is applied to the electrode 131 and the pipe 145, a leakage electric field is generated in the electrode 131. As shown in FIG. 28B, the leakage electric field results in an electric field in the vicinity of the distal end 131$a$ of the recording electrode 131. This electric field extends toward the axis of the electrode 131, making the toner particles 134 migrate in the ink meniscus 135 toward the columnar projection 132 provided in the electrode 131 and located coaxial therewith.

That component of the electric field which extends toward the counter electrode 34 makes the toner particles 134 agglomerate near the apex of the projection 132. Made of an electircally insulating resin having a small dielectric constant, the columnar projection 132 would not disturb the electric field generated near the distal end 131$a$ of the recording electrode 131. Hence, the toner 134 is stably held or trapped in the apical part of the ink meniscus 135, by virtue of the relatively intense electric field which extends toward the counter electrode 34.

The more the toner particles 134 agglomerate in the apical part of the meniscus 135, the more does increase the electrostatic force which acts on the toner particles 134 (i.e., electrically charged particles) toward the counter electrode 34. The apical part of the ink meniscus 135 therefore swells toward the counter electrode 34, covering the the apex of the columnar projection 132. The electrostatic force on the toner 134 is not strong enough to overcome the surface tension of the ink. It follows that no portion of the ink would fly, separated from the ink meniscus 135 which contains a toner agglomeration 136. In other words, no ink droplet containing the agglomeration 136 not flies from the ink meniscus 135.

Not electrically charged, the carrier liquid 133 is not influenced by the electrode field at all. The liquid 133 therefore spills over the distal end 131$a$ of the recording electrode 131. It then flows down into and collected the ink-collecting chamber 143$a$ through the gap between the electrode 131 and the pipe 145. At this time, the ink meniscus 135 remains stable because the projection 132 can be wet with the ink, because the distal end 131$a$ of the electrode 131 and the columnar projection 132 are tapered, and because the surface tension of the ink balances with the pressure at which the ink flows through the recording electrode 131.

A small amount of toner 134 may not fly from the distal end 131$a$ of the electrode 131 and may remain in in the carrier liquid 133 spilling over the the distal end 131$a$. The toner 134 may then stick onto the proximal end portion of the electrode 131, possibly impairing the flow of the carrier liquid 133. In this embodiment, to prevent such blocking of the passage of the liquid 133, a voltage as high as the drive voltage is applied to the pipe 145 located coaxial with the recording electrode 131. The toner 134 in the carrier liquid 133 would not adhere to the outer circumferential surface of the electrode 131 or the inner circumferential surface of the pipe 145, as the carrier liquid 133 flows down through the gap between the electrode 131 and the pipe 145. The toner 134 therefore flows into the ink-collecting chamber 143$a$, together with the carrier liquid 133.

When a recording voltage Vc is applied to the electrode 131 in this condition, the electrostatic force acting on the toner agglomeration 136 in the apical part of the ink meniscus 135 overcomes the surface tension of the ink. An ink droplet 137 therefore flies from the meniscus 135 toward the counter electrode 34 as is shown in FIG. 28C.

As soon as the ink droplet 137 is applied onto a recording medium (not shown), forming an ink dot thereon, the potential of the recording electrode 131 is changed back to the bias voltage Vb within the recording cycle. The ink meniscus 135 is then fast brought back to the condition shown in FIG. 28B.

The eleventh embodiment is characterized in two respects. First, the ink spilling over the distal end 131$a$ of the recording electrode 131 is collected after flowing down through the gap between the electrode 131 and the pipe 145. Second, the same voltage is applied to the electrode 131 and the the pipe 145 while the ink is flowing down through that gap. The toner 134, not having flown from the electrode 131 and hence remaining in the carrier liquid 133, therefore flows down along with the carrier liquid 133 through the gap between the electrode 131 and the pipe 145. Both the carrier liquid 133 and the toner 134 can therefore be collected.

Since the toner 134 in the ink does not adhere to the outer circumferential surface of the electrode 131 or the inner circumferential surface of the pipe 145, the ink spilling over the distal end 131*a* of the electrode 131 can smoothly flows downwards. The ink meniscus 135 at the distal end 131*a* of the recording electrode 131 can therefore maintain a desired shape and size.

The present invention is not limited to the embodiments described above. Various changes and modification can be achieved, within the scope and spirit of the invention.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. An image forming apparatus comprising:

supplying means for supplying a recording liquid to an ejecting portion spaced apart from a recording medium, said recording liquid comprising an insulating liquid and charged coloring particles dispersed in the insulating liquid;

agglomerating means for generating at the ejecting portion a ring-shaped potential well which has a higher potential at a circumference than at a center, by applying to the recording liquid a voltage having a same polarity as a charged polarity of the charged coloring particles, thereby to agglomerate the coloring particles in the ring-shaped potential well, which are contained in the recording liquid supplied by said supplying means to the ejecting portion; and recording means for generating an electric field, by applying to the recording liquid a voltage having a same polarity as a charged polarity of the charged coloring particles between the ejecting portion and the recording medium in order to cause an agglomeration of the coloring particles, formed by said agglomerating means, to fly to the recording medium, thereby to form an image on the recording medium.

2. An image forming apparatus according to claim 1, further comprising eliminating means for eliminating the ring-shaped potential well to replenish the coloring particles at the ejecting portion, thereby to make up for the coloring particles which have been made to fly by said recording medium.

3. An image forming apparatus comprising:

a ring-shaped electrode provided at an ejecting portion spaced apart from a recording medium;

supplying means for supplying a recording liquid to said ring-shaped electrode, said recording liquid comprising an insulating liquid and charged coloring particles dispersed in the insulating liquid;

agglomerating means for applying a bias voltage having a same polarity as a charged polarity of the charged coloring particles to said electrode to generate a first electric field extending from said electrode to the recording medium and a ring-shaped potential well having a ring-shaped potential distribution, thereby to trap and agglomerate the coloring particles in the ring-shaped potential well, which are contained in the recording liquid supplied by said supplying means to said electrode; and recording means for applying a recording voltage having a same polarity as a charged polarity of the charged coloring particles to said electrode to generate a second electric field which is more intense than the first electric field and which extends from said electrode to the recording medium, in order to cause an agglomeration of the coloring particles, formed by said agglomerating means, to fly to the recording medium, thereby to form an image on the recording medium.

4. An image forming apparatus according to claim 3, further comprising means for setting said electrode at a zero potential to eliminate the ring-shaped potential well and replenish the coloring particles at said electrode, thereby to make up for the coloring particles which said recording medium has caused to fly from said electrode.

5. An image forming apparatus comprising:

a plurality of ring-shaped electrodes arranged at a prescribed distance from a recording medium;

supplying means for applying a recording liquid to said ring-shaped electrodes, said recording liquid comprising an insulating liquid and charged coloring particles dispersed in the insulating liquid;

agglomerating means for applying a bias voltage having a same polarity as a charged polarity of the charged coloring particles, to any ring-shaped electrode selected in accordance with an image signal, to generate a first electric field extending from said any ring-shaded electrode to the recording medium to a ring-shaped potential well generated right above said ring-shaped electrode and having a ring-shaped potential distribution, thereby to trap and agglomerate the coloring particles in the ring-shaped potential well, which are contained in the recording liquid supplied by said supplying means to said ring-shaped electrodes; and recording means for applying a recording voltage having a same polarity as a charged polarity of the charged coloring particles to said any ring-shaded electrode to generate a second electric field which is more intense than the first electric field and which extends from said any ring-shaped electrode to the recording medium, in order to cause an agglomeration of the coloring particles, formed by said agglomerating means, to fly to the recording medium, thereby to form an image on the recording medium in accordance with the image signal.

6. An image forming apparatus according to claim 5, further comprising means for setting said any ring-shaped electrode at a zero potential to eliminate the potential well and replenish coloring particles at said any ring-shaped electrode, thereby to make up for the coloring particles which said recording medium has caused to fly from said any ring-shaped electrode.

7. An image forming apparatus comprising:

a liquid-transporting means having a liquid-ejecting port at its distal end, which opposes a recording medium and which is spaced therefrom;

supplying means for applying a recording liquid to said liquid-ejecting port through said liquid-transporting means, said recording liquid comprising an insulating liquid and charged coloring particles dispersed in the insulating liquid;

agglomerating means for generating a first electric field near said liquid-ejecting port, thereby to agglomerate the coloring particles in the recording liquid;

recording means for generating a second electric field more intense than the first electric field in the vicinity of said liquid-ejecting port, thereby to cause an agglomeration of coloring particles, formed by said agglomerating means, to fly to the recording medium; and collecting means for collecting that part of the recording liquid which supplied to said liquid-ejecting port by said supplying means, which spills over said liquid-ejecting port and which flows along an outer surface of said liquid-transporting means.

8. An image forming apparatus comprising:

a tubular electrode having inner and outer circumferential surfaces, a distal end and a liquid-ejecting port at the distal end, the liquid-electing port opposing a recording medium and being spaced therefrom;

supplying means for applying a recording liquid to said liquid-ejecting port through said tubular electrode thereby to form, at said liquid-ejecting port, an ink meniscus which bulges toward the recording medium, said recording liquid comprising an insulating liquid and charged coloring particles dispersed in the insulating liquid;

agglomerating means for applying a bias voltage to said electrode to generate a first electric field extending from said electrode to the recording medium, thereby to agglomerate the coloring particles in an apical part of the meniscus formed by said supplying means;

recording means for applying a recording voltage to generate a second electric field more intense than the first electric field and extending from said electrode to the recording medium, thereby to cause an agglomeration of the coloring particles, formed by said agglomerating means, to fly to the recording medium and thus form an image on the recording medium; and collecting means for collecting that part of the recording liquid which is supplied to said liquid-ejecting port by said supplying means, which spills over said liquid-ejecting port and which flows along the outer circumferential surface of said electrode.

9. An image forming apparatus according to claim 8, wherein said electrode has at the distal end a tapered part which inclines downwards from the outer circumferential surface to the inner circumferential surface.

10. An image forming apparatus according to claim 8, wherein said electrode has at the distal end a tapered part which inclines upwards from the outer circumferential surface to the inner circumferential surface.

11. An image forming apparatus according to claim 8, wherein said electrode has a plurality of grooves in the distal end, each extending from the outer circumferential surface to the inner circumferential surface.

12. An image forming apparatus according to claim 8, wherein said electrode has a plurality of grooves in the outer circumferential surface, each extending from the distal end to a proximal end, and that part of the recording liquid which spills over said liquid-ejecting port is drawn into the grooves by virtue of capillary action.

13. An image forming apparatus according to claim 8, wherein a projection is provided on said electrode, closing a part of said liquid-ejecting port.

14. An image forming apparatus according to claim 8, wherein the distal end of said electrode is a rounded rim extending from the outer circumferential surface to the inner circumferential surface.

15. An image forming apparatus according to claim 8, wherein a projection is provided in said electrode, is located coaxial therewith and has a distal portion protruding from the distal end of said electrode and converging toward the recording medium.

16. An image forming apparatus according to claim 8, wherein said electrode has at the distal end a tapered part which inclines upwards from the outer circumferential surface to the inner circumferential surface, a projection is provided in said electrode, is located coaxial therewith and has a distal portion protruding from the distal end of said electrode and converging toward the recording medium, and the tapered part of said electrode is flush with the distal portion of said projection.

17. An image forming apparatus according to claim 8, wherein said collecting means has a pipe surrounding said electrode and located coaxial therewith, and that part of the recording liquid which spills over said liquid-ejecting port is collected through a gap between said electrode and said pipe.

18. An image forming apparatus according to claim 17, wherein the bias voltage is applied to said electrode and said pipe at the same time.

19. An image forming apparatus according to claim 17, wherein said pipe has a distal end located below the distal end of said electrode.

20. An image forming apparatus according to claim 17, wherein said electrode has at the distal end a tapered part which extends from the outer circumferential surface to the inner circumferential surface.

21. An image forming apparatus according to claim 17, wherein an electrically insulating projection is provided in said electrode, is located coaxial therewith and has a distal portion protruding from the distal end of said electrode and converging toward the recording medium.

22. A method of forming an image on a recording medium, comprising the steps of:

supplying a recording liquid to a liquid-ejecting portion spaced apart from the recording medium by a predetermined distance, said recording liquid comprising an insulating liquid and charged coloring particles dispersed in the insulating liquid;

generating at the liquid-ejecting portion a ring-shaped potential well which has a higher potential at a circumference than at a center, by applying to the recording liquid a voltage having a same polarity as a charged polarity of the charred coloring particles, thereby to trap and agglomerate the coloring particles in the ring-shaped potential well, which are contained in the recording liquid supplied to the liquid-ejecting portion; and generating an electric field, by applying to the recording liquid a voltage having a same polarity as a charged polarity of the charged coloring particles near the liquid-ejecting portion in order to cause the agglomerated coloring particles to fly to the recording medium, thereby to form an image on the recording medium.

* * * * *